US011711357B2

(12) United States Patent
Nelson et al.

(10) Patent No.: US 11,711,357 B2
(45) Date of Patent: Jul. 25, 2023

(54) IDENTITY DATA OBJECT CREATION AND MANAGEMENT

(71) Applicant: NETFLIX, INC., Los Gatos, CA (US)

(72) Inventors: Travis Nelson, San Francisco, CA (US); Justin Ryan, San Carlos, CA (US); Sunny Singh, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 326 days.

(21) Appl. No.: 16/543,418

(22) Filed: Aug. 16, 2019

(65) Prior Publication Data

US 2021/0051143 A1 Feb. 18, 2021

(51) Int. Cl.
*H04L 9/40* (2022.01)

(52) U.S. Cl.
CPC ...... *H04L 63/0853* (2013.01); *H04L 63/0876* (2013.01); *H04L 63/102* (2013.01)

(58) Field of Classification Search
CPC ............. H04L 63/0853; H04L 63/0876; H04L 63/102; H04L 63/123; H04L 63/0807
See application file for complete search history.

(56) References Cited

U.S. PATENT DOCUMENTS

| 8,874,902 | B2* | 10/2014 | Ackerly | G06F 21/305 |
| | | | | 713/155 |
| 2013/0044307 | A1* | 2/2013 | Shibazaki | G03F 7/707 |
| | | | | 355/72 |
| 2016/0142409 | A1* | 5/2016 | Frei | G06F 21/33 |
| | | | | 713/176 |
| 2017/0142085 | A1* | 5/2017 | Zhang | H04L 9/3268 |
| 2019/0097987 | A1* | 3/2019 | Talur | H04L 63/08 |
| 2019/0286832 | A1* | 9/2019 | Szeto | H04W 12/082 |
| 2020/0068028 | A1* | 2/2020 | Gurtin | H04L 67/561 |

FOREIGN PATENT DOCUMENTS

WO 2013/044307 A1 4/2013

OTHER PUBLICATIONS

International Search Report for application No. PCT/US2020/046437 dated Sep. 22, 2020.

* cited by examiner

*Primary Examiner* — Khoi V Le
(74) *Attorney, Agent, or Firm* — Artegis Law Group, LLP

(57) ABSTRACT

Various embodiments of the present application set forth a computer-implemented method that includes receiving, by a first service operating within a computing system, a modified identity data object from a second service operating within the computing system, where the modified identity data object includes at least one identifier associated with a client of the computing system determining, by the first service, that the second service performed a first action on an identity data object to generate the modified identity data object, and validating the modified identity data object based on whether the second service is authorized to perform the first action.

20 Claims, 10 Drawing Sheets

IDENTITY DATA OBJECT CREATION AND MANAGEMENT

BACKGROUND

Field of the Various Embodiments

Embodiments of the present invention relate generally to distributed computing systems and, more specifically, to identity data object creation and management.

Description of the Related Art

Distributed computing systems include many different hardware and software components that operate to provide a variety of services to clients of the distributed computer systems. For example, a distributed computing system executing a video streaming service could provide access to a library of media titles that can be viewed on a range of different client devices. In order to authenticate a user, a client device connects to one or more devices included within the distributed computing system for various actions, such as sign-in. The distributed computing system may, in turn, authenticate the identity of the client that is attempting to access the distributed computing system. Upon authenticating the client, the distributed computing system may then authorize the client to access one or more of the various services.

For example, a client could use a client device to send a message to an edge device in the distributed computing system. The message can include one or more identity data objects, such as message service layer tokens, identification cookies, identification fields in message headers, and so forth. The identity data object is associated with the identity of the user or the user device, and indicates that the message is being sent on behalf of a specific user or device controlled by the user. In such instances, the edge device could then validate the included tokens in order to authenticate the user. The edge device could also pass the validated token to other devices within the distributed computing system in order to verify that the client is authorized to access services within the distributed computing system.

Identity data objects, such as tokens, can have a variety of formats. One drawback of using such identity data objects to authenticate the clients of the distributed computing system is that an authentication mechanism needs to be developed and maintained for each distinct type of identity data objects. For example, a client may use a token of a first type to authenticate her identity, while the client device uses a token of a second type to authenticate the device itself. The authenticating device within the distributed computing system would need to support each type of token in order to properly perform authentication.

Because of the complexity of authenticating each type of identity object, various services of the distributed computing system consume long times in order to effectively authenticate multiple identity objects. Further, various other services often forego authenticating the client or verifying that the client as authorized. Foregoing authenticating clients in such a manner is undesirable as the distributed computing system may become vulnerable to security attacks As the foregoing illustrates, what is needed in the art are more effective techniques to orchestrate authentication of clients within a distributed computing system.

SUMMARY

Various embodiments of the present application set forth a computer-implemented method that includes receiving, by a first service operating within a computing system, a modified identity data object from a second service operating within the computing system, where the modified identity data object includes at least one identifier associated with a client of the computing system, determining, by the first service, that the second service performed a first action on an identity data object to generate the modified identity data object, and validating the modified identity data object based on whether the second service is authorized to perform the first action.

Other embodiments include, without limitation, one or more computer-readable media including instructions for performing one or more aspects of the disclosed techniques, as well as a computing device for performing one or more aspects of the disclosed techniques.

At least one technological advantage of the disclosed techniques relative to the prior art is that a trusted device can orchestrate the use and modification of a single identity data object within a distributed computing system. Using a single identity data object enables services to trust the authenticity of both the user and associated device when attempting access to the distributed computing system. Further, restricting the devices within the distributed computing system that can modify the identity data object provides greater control on the information that is routed through the network through the identity data object.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
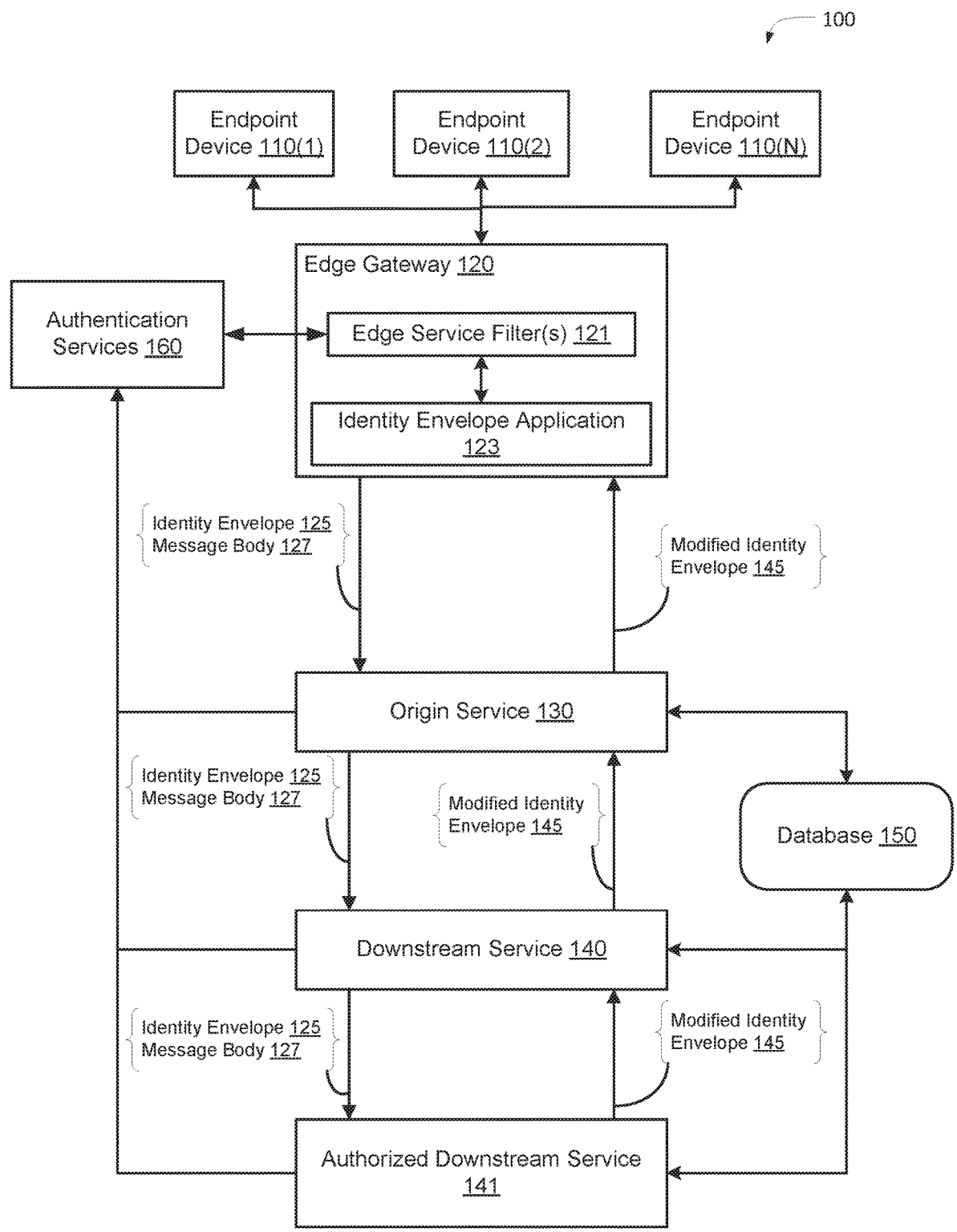
FIG. 1 illustrates an edge network providing services to a client that is configured to implement one or more aspects of the present invention.

In the following description, numerous specific details are set forth to provide a more thorough understanding of the various embodiments. However, it will be apparent to one of skilled in the art that the inventive concepts may be practiced without one or more of these specific details.

Overview

Distributed computing systems include many different hardware and software components that operate to provide a variety of services to clients of the distributed computer systems. For example, a distributed computing system executing a video streaming service could provide access to a library of media titles that can be viewed on a range of different client devices. When a client of the service connects to the distributed computing system, one or more services within the distributed computing system attempt to confirm the identity of the client and confirm that the user is permitted to access a particular service. For example, a client device sends a service request message that includes one or more data objects that specify the identity of the client. Such an identity data object indicates that the message is being sent on behalf of a specific user or device controlled by the user. The message sent by the client device may have one or more identity data objects, such as message service layer tokens, identification cookies, identification fields in message headers, and so forth. In such instances, a service within the distributing computing network validates identity data object in order to authenticate the user.

Prior art techniques would have each service within the distributed computing network separately authenticate each message by independently authenticating the included identity data objects. However, a given message received by a service could have an identity data object that has one of a variety of possible formats. Consequently, one drawback of the distributed computing using such identity data objects to authenticate the clients is that an authentication mechanism needs to be developed and maintained for each distinct format type of identity data objects. For example, a client may use a token of a first type to authenticate her identity, while the client device uses a token of a second type to authenticate the device itself. Each service within the distributed computing system would need to support each type of token in order to properly perform authentication. Thus, prior art techniques do not properly account for authenticating multiple identity data objects of different types.

In contrast, the disclosed techniques enable an identity management service within the distributed computing system to authenticate a client more efficiently by generating and authenticating a single identity data objects that includes identity information. The identity management service can therefore provide a single identity data object that is trusted by other services within the distributed computing system and can control which services can modify the single identity data object. Such techniques enhance the effectiveness of the distributed computing system when authenticating messages associated with a client.

In various embodiments, the distributed computing system includes a gateway that generates a single identity data object (also referred to herein as an "identity envelope") that provides identity information of a specific client or client device. The identity envelope is of a general-purpose format that can be used across multiple platforms, such as services coded in Javascript and Java. A given identity envelope includes one or more identity values that specify the identity of a client or a client device. Some services are permitted to modify the identity envelope by changing one or more identity values within the envelope, creating a modified version of the original identity envelope.

When the gateway subsequently receives the modified identity envelope, the gateway validates the changes made to the modified identity envelope by verifying that the service that performed the change was authorized to perform that particular action. Once the gateway verifies the modified identity envelope, the gateway can destroy the modified identity envelope and use information that was included in the modified identity envelope to generate other authentication tokens or authentication cookies in different formats.

Advantageously, a gateway device that employs the disclosed identity envelope creation and management techniques address various limitations of conventional devices that use identity data objects. More specifically, conventional gateway devices do not create a single identity object based on one or more other identity data objects and, consequently, require that other services within the distributed computing system separately authenticate the identity objects. As a result, conventional gateway devices cause each service within the distributed computing system to inefficiently authenticate messages separately, or cause services to trust identity objects without actually authenticating the identity objects, causing inefficiencies and insecurities within the distributed computing system.

By contrast, the gateway device that employs the disclosed identity envelope creation and management techniques generates and manages the contents of a single identity data object that is trusted by other services within the distributed computing system. Other services within the distributed computing system can quickly process messages based on the single identity data object providing proof that the service is permitted to act on behalf of a specified client. Further, the gateway device orchestrates the modification of the single identity data object by restricting the devices within the distributed computing system that can modify the identity data object, thereby providing greater control on the information that is routed through the network through the identity data object.

Identity Envelope Creation and Management

FIG. 1 illustrates an edge network 100 providing services to a client that is configured to implement one or more aspects of the present invention. As shown, edge network 100 includes, without limitation, endpoint devices 110(1)-110(N), edge gateway 120, origin service 130, downstream service 140, authorized downstream service 141, database 150, and authentication services 160.

In various embodiments, origin service 130, downstream service 140, authorized downstream service 141, database 150, and authentication services 160 collectively operate to expose specific functionalities to the endpoint devices 110. Components within edge network 100, including endpoint devices 110(0)-110(N), edge gateway 120, origin service 130, downstream service 140, authorized downstream service 141, database 150, and authentication services 160, communicate with each other via any technically-feasible combination of point-to-point connections and one or more communications networks. Such networks may include any suitable environment to enable communications among remote or local computer systems and computing devices, including, without limitation, wireless and wired LANs and internet-based WANs (Wide Area Networks). In various embodiments, components within edge network 100 may send messages via in-band communication channels and may transmit metadata via out-of-band communication channels.

In operation, endpoint device 110(1) issues one or more requests in order to interact with one or more services implemented in the edge network 100. In response to a request, one or more of origin service 130, downstream service 140, authorized downstream service 141, database 150, and authentication services 160 in the edge network 100 execute software to perform operations related to processing the request and, subsequently, issue responses to the request. The operations related to processing a request may involve accessing data stored within database 150, issuing requests to additional services internal or external to the edge network 100, and/or performing computational operations on inputs provided in conjunction with the request.

For example, one or more components within edge network 100 could include services to provide content distribution functionality. In such instances, endpoint device 110 could transmit a request towards origin service 130 for content recommendations associated with a current client session. Origin service 130 could, in turn, generate requests directed towards one or more downstream service 140 and/or authorized downstream service 141. Downstream service 140 and/or authorized downstream service 141 could then perform one or more computational operations and/or access data from database 150 in order to generate content recommendations associated with the current client session. Origin service 130 could receive the content recommendations and then transmit the recommendations to endpoint device 110(1).

In various embodiments, one or more endpoint devices 110 (e.g., 110(1), 110(2), to 110(N)) include computer systems, set-top boxes (STBs), mobile computers, smartphones, tablets, console and handheld video game systems, digital video recorders (DVRs), DVD players, connected digital TVs, dedicated media streaming devices (e.g., an Apple® TV set-top box, a Roku® set-top box, etc.), and/or any other technically-feasible computing platform that has network connectivity and is capable of presenting content, such as text, images, audio, and/or video content, to a user. In various embodiments, endpoint device 110 may send messages to components within edge network 100 in order to access functionality. Such messages may include one or more authentication data objects that include information that identifies the user ("client") and/or endpoint device 110 ("client device"). Such authentication data objects could include, for example, one or more authentication tokens and/or cookies including data values that act as identifiers for the user. For example, an authentication cookie may include a text string specifying the user identifier associated with a given user ("Example_Identifier_1234").

Edge gateway 120 is a device within edge network 100 that operates as a gateway between the endpoint devices 110 and other components within edge network 100. In various embodiments, edge gateway 120 may route, monitor, and/or provides security for requests received from the endpoint devices 110. For example, edge gateway 120 may use one or more edge service filters 121 to extract information from authentication data objects. In operation, edge gateway 120 routes requests received from the endpoint device 110 to origin service 130 corresponding to the request. For example, upon receiving a message, edge gateway may send an in-band message to origin service 130 that includes message body 127. In various embodiments, edge gateway 120 may determine a particular origin service 130 corresponding to a given request based one or more criteria. The type of criteria could include, for example, the type of the request, the type of endpoint device 110 that transmitted the request, and/or any other configurable criteria. In various embodiments, edge gateway 120 may include a load balancing service that controls the volume of requests handled by one or more origin services 130.

Edge service filter(s) 121 include one or more separate filters that implement one or more protocols to extract data from authentication data objects. In various embodiments, one or more edge service filters 121 may communicate with authentication services 160 to verify the validity of received authentication data objects and may extract data from valid authentication objects. In various embodiments, edge gateway 120 may also implement one or more edge service filters 121 to generate modified authentication data objects using updated information. For example, edge gateway 120 could extract new data values from modified identity envelope 145 and may generate a modified authentication token that includes the new data values.

Edge gateway 120 executes identity envelope application 123 to create and/or validate identity envelopes. An identity envelope (IE) is a data object that specifies the identity of a client and/or client device for components within edge network 100 in lieu of the one or more authentication data objects received by edge gateways 120. In some embodiments, identity envelope 125 includes data values corresponding to the identity of the user (e.g., subscriber ID), as well as data values corresponding to the identity of the device associated with the user (e.g., device ID). In various embodiments, edge gateway 120 may receive multiple authentication data objects and may extract data values from each of the received authentication data objects. Edge gateway 120 may then execute identity envelope application 123 in order to generate identity envelope 125 that includes the extracted values.

In various embodiments, one or more of origin service 130, downstream service 140, and/or authorized downstream service 141 may receive a message that includes message body 127 and/or identity envelope 125. In some embodiments, a service may route the identity envelope 125 without modifying the contents of identity envelope 125. For example, origin service 130 could read the contents of identity envelope 125 without modifying the contents. Additionally or alternatively, downstream service 140 could pass-through identity envelope 125 by routing identity envelope 125 to another service without reading the contents of identity envelope 125.

In various embodiments, one or more authorized downstream services 141 may mutate identity envelope 125 by modifying the contents of identity envelope 125 in order to generate modified identity envelope 145. In various embodiments, one or more authorized downstream services may perform one or more actions that change the contents of identity envelope 125 by adding, deleting, and/or updating data values included in identity envelope 125. In such instances, the one or more authorized downstream services 141 may generate data integrity values, such as action log entries and/or hashes that record the modification. Subsequently, services may use the data integrity values to verify the updated value, or to reject the updated value and revert to a previous value.

For example, an authorized downstream service 141 could be an authorization service that is approved to perform a set of actions using identity envelope 125. One such action could be updating identity envelope 125 to include the services authorized to be accessed by the user and capable of being performed by endpoint device 110(1). Authorized downstream service 141 could use information included in identity envelope 125 and/or message body 127 to retrieve authorization data values associated with the user and/or endpoint device 110. Authorized downstream service 141 could then update identity envelope 125 by generating modified identity envelope 145 that includes the retrieved authorization information. Authorized downstream service 141 may also generate a new hash based on the new value and may store a previous hash in a different portion of modified identity envelope 145.

In various embodiments, authorized downstream service 141 could retrieve a specified key to modify the contents of identity envelope 125. For example, authorized downstream service 141 could retrieve a user information key to update the user information included in identity envelope 125. Additionally or alternatively, authorized downstream service 141 could retrieve a separate device information key to update the device information included in identity envelope 125. In various embodiments, authorized downstream service 141 may use a public/private key pair when mutating identity envelope 125. In such instances, identity envelope 125 may include a hash generated using a private key and a key pair name, and authorized downstream service 141 could retrieve the corresponding public key. Upon retrieving the public key, authorized downstream service 141 could then validate identity envelope 125. In various embodiments, authorized downstream service 141 may also mutate identity envelope 125 by providing the hash using the key name and private key from a different key pair (e.g., the key pair assigned to be used by authorized downstream service 141).

Database 150 stores data for the one or more services 130, 140, 141 within edge network 100. In various embodiments, different portions of the database 150 may be accessed by the different services 130, 140, 141. For example, database 150 may be a subscriber database that stores authorizations and personal preferences. Authorized downstream service 141 could access a portion of database 150 in order to obtain a set of services the user is authorized to access. Additionally or alternatively, downstream service 140 could be a personalization service that accesses a different portion of database 150 to access the user's personal preferences. In various embodiments, one or more services 130, 140, 141 may read user information and/or device information from identity envelope 125 and/or modified identity envelope 145 in order to access different portions of database 150.

In various embodiments, the one or more services 130 may route and/or process modified identity envelope 145 without modifying the contents of modified identity envelope 145. In such instances, the one or more services 130 may route and/or process modified identity envelope 145 in a similar manner that the one or more services 130 route and/or process identity envelope 125. For example, downstream service 140 could read the contents of modified identity envelope 145 without modifying the contents. Additionally or alternatively, origin service 130 could passthrough modified identity envelope 145 by routing modified identity envelope 145 to edge gateway 120 without reading the contents of modified identity envelope 145. In various embodiments, other authorized downstream services 141 may mutate modified identity envelope 145 by modifying the contents of modified identity envelope 145, thereby generating a supplemental identity envelope (not shown).

Upon receiving modified identity envelope 145, edge gateway 120 may execute identity envelope application 123 to process modified identity envelope 145 to verify that each change made to the included contents of modified identity envelope 145 were valid. In various embodiments, various authorized downstream services 141 may modify various data values to generate modified identity envelope 145, where modified identity envelope 145 includes a log of actions taken to modify the data values, along with the services that performed the modification. For example, modified identity envelope 145 could include multiple hashes, where each hash includes a hash-based message authentication code (HMAC) that verifies both the data integrity of the respective data values and the authenticity of the data values. Edge gateway 120 could check one or more HMAC values in order to determine each action taken by the one or more authorized downstream services 141 that modified data values included in modified identity envelope 145. In some embodiments, edge gateway 120 may compare the action to a defined list of authorized actions that authorized downstream services 141 is allowed to perform in conjunction with identity envelope 125. Edge gateway 120 may then verify that the action taken by authorized downstream service 141 was approved and allow the update to modified identity envelope 145. Alternatively, edge gateway may determine that the action taken by authorized downstream service 141 was not approved and could instead include the previous data value.

In some embodiments, edge gateway 120 could execute identity envelope application 123 to determine whether the correct key was used by authorized downstream service 141 when performing the determined action. For example, identity envelope application 123 may check a key name included in modified identity envelope 145 to determine whether the appropriate key was used by authorized downstream service 141 when making a modification. When edge gateway 120 determines that the appropriate key was used, edge gateway 120 approves the action; otherwise, edge gateway 120 determines that the appropriate key was not used and rejects the determined action, reverting modified identity envelope 145 to instead include the previous data value.

Authentication services 160 include one or more services that process various authentication data objects. In various embodiments, authentication services 160 may include separate services that independently process and/or modify different data objects. For example, one authentication service could inspect, renew, create, and/or expire cookies. A different authentication service could, in turn, act as a termination point in order to process and/or modify a specific type of authentication token (e.g., message security layer tokens, javascript web tokens, etc.).

In various embodiments, edge gateway 120 may execute one or more edge service filters 121 to communicate with authentication services 160 in order to confirm that external authentication data objects, such as authorization tokens or cookies received from endpoint devices 110 are valid. In some embodiments, the one or more edge service filters 121 may communicate with authentication services 160 in order to confirm that one or more data values included in modified identity envelope 145 are valid. In such instances, edge gateway 120 may use the one or more edge service filters 121 to modify an external authorization data object to include one or more updated data values included in modified identity envelope 145.

Figure 2:
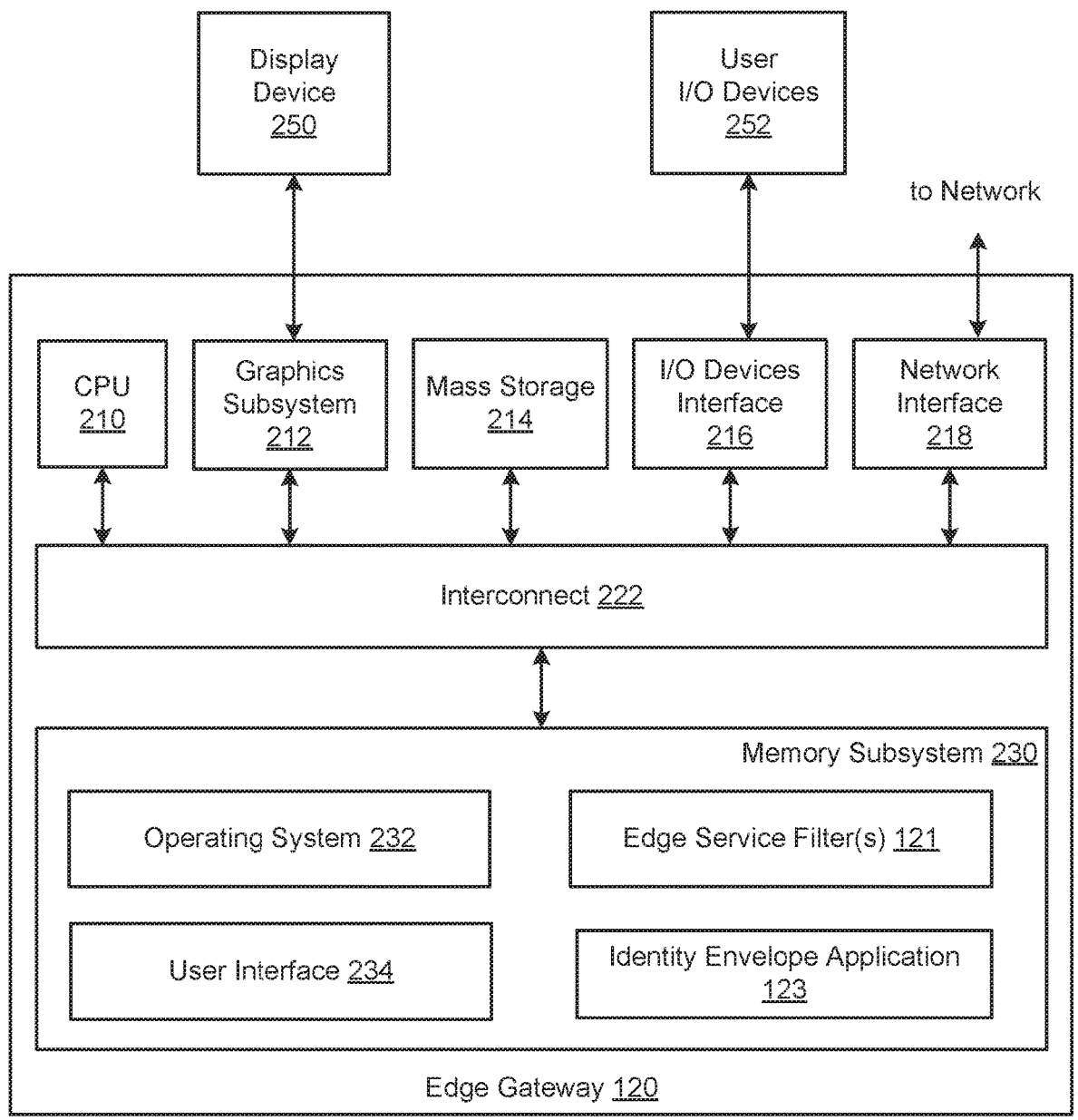
FIG. 2 is a more-detailed illustration of the edge gateway device of FIG. 1, according to various embodiments of the present invention.

FIG. 2 is a more-detailed illustration of the edge gateway device 120 of FIG. 1, according to various embodiments of the present invention. As shown, edge gateway 120 may include, without limitation, CPU 210, graphics subsystem 212, mass storage unit 214, I/O devices interface 216, network interface 218, interconnect 222, and memory subsystem 230.

In some embodiments, CPU 210 is configured to retrieve and execute programming instructions stored in memory subsystem 230. Similarly, CPU 210 is configured to store and retrieve application data (e.g., software libraries) residing in the memory subsystem 230. Additionally or alternatively, CPU 210 is configured to store and retrieve data, including content items and/or application data, from mass storage unit 214. Interconnect 222 is configured to facilitate transmission of data, such as programming instructions and application data, between the CPU 210, graphics subsystem 212, mass storage unit 214, I/O devices interface 216, network interface 218, and memory subsystem 230.

Graphics subsystem 212 is configured to generate frames of video data and transmit the frames of video data to display device 250. In various embodiments, graphics subsystem 212 may be integrated, along with CPU 210, into an integrated circuit (IC). Display device 250 may comprise any technically-feasible means for generating an image for display. For example, display device 250 could be fabricated using liquid crystal display (LCD) technology, cathode-ray tube technology, and/or light-emitting diode (LED) display technology. In various embodiments, display device 250 may display one or more graphical user interfaces (GUIs).

Mass storage unit 214 can include, for example, a hard disk drive and/or flash-memory storage drive, and is configured to store nonvolatile data. For example, mass storage unit 214 could store one or more files, such as content items and/or application data. In various embodiments, edge gateway 120 may copy one or more files stored in memory subsystem 230 to mass storage unit 214.

Input/output (I/O) device interface 216 is configured to receive input data from user one or more I/O devices 252 and transmit the input data to CPU 210 via interconnect 222. For example, user I/O device 252 may comprise one of more buttons, a keyboard, and a mouse or other pointing device. In various embodiments, I/O device interface 216 also includes an audio output unit configured to generate an electrical audio output signal. In such instances, user I/O device 252 may include an audio output device, such as headphones and/or a loudspeaker, configured to generate an acoustic output in response to the electrical audio input signal. Additionally or alternatively, display device 250 may include the loudspeaker. Examples of suitable devices known in the art that can display video frames and generate an acoustic output include televisions, smartphones, smartwatches, electronic tablets, etc.

Network interface 218 is configured to transmit and receive packets of data via a network (e.g., edge network 100). In some embodiments, network interface 218 is configured to communicate using at least one of the Ethernet standard, the Bluetooth standard, and/or one or more wireless communication standards. Network interface 218 is coupled to CPU 210 via interconnect 222.

Memory subsystem 230 includes programming instructions and application data. In various embodiments, memory subsystem may include operating system 232, user interface 234, edge service filters 121, and/or identity envelope application 123. Operating system 232 performs system management functions, such as managing hardware devices including graphics subsystem 212, mass storage unit 214, I/O device interface 216, and network interface 218. Operating system 232 also provides process and memory management models for user interface 234, edge service filters 121, and identity envelope application 123. For example, edge gateway 120 may execute operating system 232 to write data and/or to extract data from data objects using edge service filters 121 and/or generate identity envelopes 125 using identity envelope application 123. Additionally, edge gateway 120 may execute operating system 232 to generate and/or delete identity envelopes 125, 145.

Figure 3A:
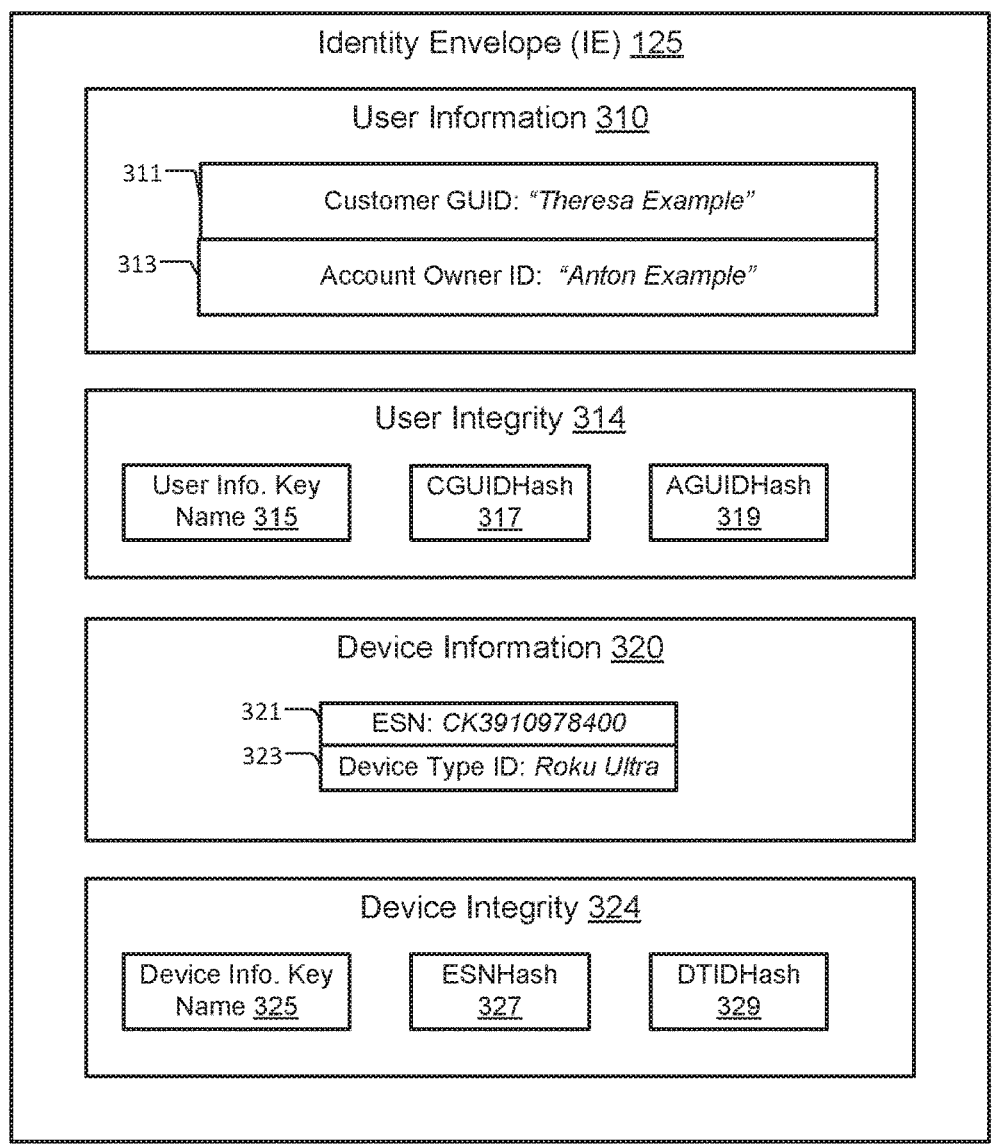
FIG. 3A is a more-detailed illustration of an identity envelope initially generated by the edge gateway device of FIG. 1, according to various embodiments of the present invention.

FIG. 3A is a more-detailed illustration of an identity envelope 125 initially generated by the edge gateway device of FIG. 1, according to various embodiments of the present invention. As shown, identity envelope 125 includes user information 310, user integrity data 313, device information 320, and device integrity data 324. User information 310 includes user data values, 311, 313 such as a customer GUID value and an account owner ID. User integrity data 314 includes user information key name 315, and user data hashes 317, 319. Device information 320 includes device data values, 321, 323, such as an electronic serial number (ESN) and a Device Type ID. Device integrity data 324 includes device information key name 325, and device data hashes 327, 329. In other embodiments, identity envelope 125 includes only one of user information 310 or device information 320, and/or includes other information in user information 310 and/or device information 320 that is not specifically illustrated in FIG. 3A.

In operation, edge gateway 120 executes identity envelope application 123 in order to generate identity envelope 125 such that identity envelope 125 includes user information 310 and device information 320. Additionally or alternatively, edge gateway 120 extracts one or more user data values 311, 313 and/or device data values 321, 323 from one or more external authentication data objects, such as authentication tokens received from endpoint device 110. In various embodiments, identity envelope application 123 may use one or more keys to generate hashes 317, 319, 327, 329 from the respective data values 311, 313, 321, 323. Edge gateway 120 stores hashes 317, 319, 327, 329 in user integrity data 314 and/or device integrity data 324. Edge gateway may also store the respective key names 315, 325 corresponding to the keys used to generate hashes 317, 319, 327, 329 in user integrity data 314 and/or device integrity data 324.

User information 310 includes one or more data values associated with identifying a unique user. For example, user information 310 could store data values 311, 313, for one or more fields including customer global user identifier (GUID), an account owner identifier a decentralized identifier (DID), and so forth. In various embodiments, identity envelope application 123 can generate identity envelope 125 that includes one or more data values 311, 313 that corresponds to a particular user. User integrity data 314 includes hashes 317, 319 generated based on one or more data values 311, 313 included in user information 310. In various embodiments, user integrity data 314 may also include user information key name 315, which corresponds to the user information key used to generate hashes 317, 319.

Device information 320 includes one or more data values associated with identifying a unique device that is associated with the user. For example, device information 320 can include data values 321, 323 for one or more fields including an electronic serial number (ESN) and a device type identifier. In various embodiments, identity envelope application 123 can generate identity envelope 125 that includes one or more data values 311, 313 that corresponds to a particular device.

Device integrity data 324 includes hashes 327, 329 generated based on one or more data values 321, 323 included in device information 320. In various embodiments, device integrity data 324 may also include device information key name 325, which corresponds to the device information key used to generate hashes 327, 329.

Figure 3B:
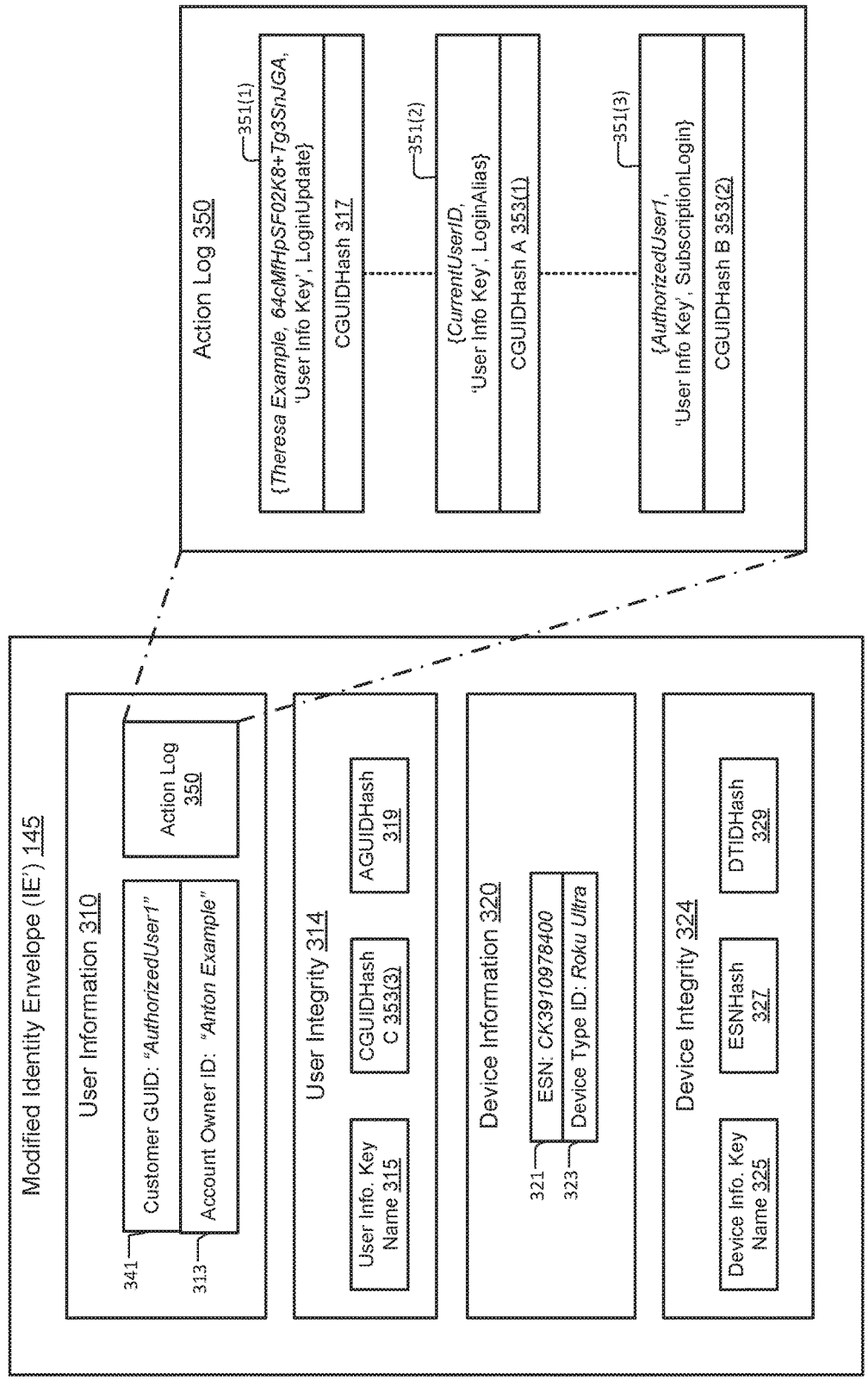
FIG. 3B is a more-detailed illustration of a modified identity envelope that is modified by service(s) included in the edge network of FIG. 1, according to various embodiments of the present invention.

FIG. 3B is a more-detailed illustration of a modified identity envelope 145 that is modified by service(s) included in the edge network of FIG. 1, according to various embodiments of the present invention. As shown, modified identity envelope (IE') 145 includes user information 310, user integrity data 314, device information 320, and device integrity data 324. User information 310 includes modified user data value 341, unmodified data value 313, and action log 350. User integrity data 314 includes user information key name 315, modified user data hash 353(3), and unmodified user data hash 319. Device information 320 includes device data values 321, 323. Device integrity data 324 includes device information key name 325, and device data hashes 327, 329. Action log 350 includes multiple entries 351 corresponding to actions taken on data value 341, along with updated hashes 353 based on each respective entry 351.

Modified identity envelope (IE') 145 is a version of identity envelope 125 that is generated when authorized downstream services 141 mutate identity envelope 125. In various embodiments, one or more authorized downstream services 141 may perform one or more permitted actions in conjunction with identity envelope 125 to modify at least one data value that is originally included in identity envelope 145. In such instances, authorized downstream service 141 may record the actions taken by adding entries 351 (e.g., 351(1), 351(2), 351(3)) to action log 350. Edge gateway 120 may then analyze the values included in each entry 351 and/or a hash associated with each entry 351 in order to verify that authorized downstream service 141 was permitted to perform the recorded action.

In various embodiments, different authorized downstream services 141 may have access to different keys. For example, a first authorized downstream service could only be permitted to modify user information 310. In such instances, the first authorized downstream service may retrieve a user information key in order to modify one or more user data fields from user data values 311, 313 to modified user data values (e.g., modified data value 341). Additionally or alternatively, the first authorized downstream service could use the user information key to generate an updated user hash (e.g., hash 353(3)) that replaces an initial user hash 317.

Action log 350 stores one or more entries 351 (e.g., 351(1)-351(3)) that record the actions taken by one or more authorized downstream service 141 when mutating identity envelope 125. For example, entry 351(1) is a record corresponding to a "LoginUpdate" action taken by authorized downstream service 141 that updated the Customer GUID field from an initial user data value 311 of "Theresa Example" to an updated user data value "64cMfHpSF02K8+Tg3SnJGA," which corresponds to a unique customer GUID values that authorized downstream service 141 retrieved from database 150. In such instances, authorized downstream service 141 could generate an updated hash (CGUIDHash A 353(1)) and add the updated hash to user integrity data 314. Authorized downstream service 141 could then move the previous hash (CGUIDHash 317) to action log 350, where the previous hash is linked with entry 351(1). In this manner, each entry is linked with the previous hash, which enables other services to verify entries based by following a chain of linked entries.

For example, user information 310 includes updated data value 341, where authorized downstream service 141 performed a "SubscriptionLogin" action that updated the Customer GUID field from a previous user data value of "CurrentUserID" to an updated user data value of "AuthorizedUser1." Action log 350 includes entry 351(3) that corresponds to the "SubscriptionLogin" action, and the previous hash (CGUIDHash B 353(2)) that was moved from user integrity data 314 to action log 350. User integrity data 314 includes an updated hash (CGUIDHash C 353(3)) generated from entry 351(3).

In various embodiments, edge gateway 120 may verify whether authorized downstream service 141 was permitted to perform the recorded "LoginUpdate" action by comparing the recorded action to a list of permitted actions. In some embodiments, the list of permitted actions also specifies which authorized downstream service 141 is permitted to perform a particular action. Edge gateway 120 verifies that the recorded action is permitted when the action recorded in an entry 351 matches a corresponding permitted action in the list of permitted actions.

Alternatively, edge gateway 120 may verify whether authorized downstream service 141 was permitted to perform the recorded action by determining whether edge gateway 120 used the key corresponding to modifying data values for user information (e.g., user information key) by referring to the key name included in entry 351. Edge gateway 120 verifies that the recorded action is permitted when the key name recorded in entry 351 matches the user information key name 315. In instances where edge gateway 120 determines that the key name recorded in entry 351 does not matches the user information key name 315 (e.g., authorized downstream service 141 used device information key 325 to change user data values), edge gateway 120 does not verify the recorded action.

In various embodiments, edge gateway 120 may refer to one or more previous hashes (e.g., previous hashes 317, 353(1), 353(2)) to revert the user data value to a previous user data value that was authorized. For example, edge gateway 120 could verify the LoginUpdate action, but could not verify the LoginAlias or SubscriptionLogin actions. In such instances, edge gateway 120 could use hashes 353(3), 353(2), and 353(1) to revert the modified user data value 341 of "AuthorizedUser1" back to the verified user data value of "64cMfHpSF02K8+Tg3SnJGA."

Figure 4:
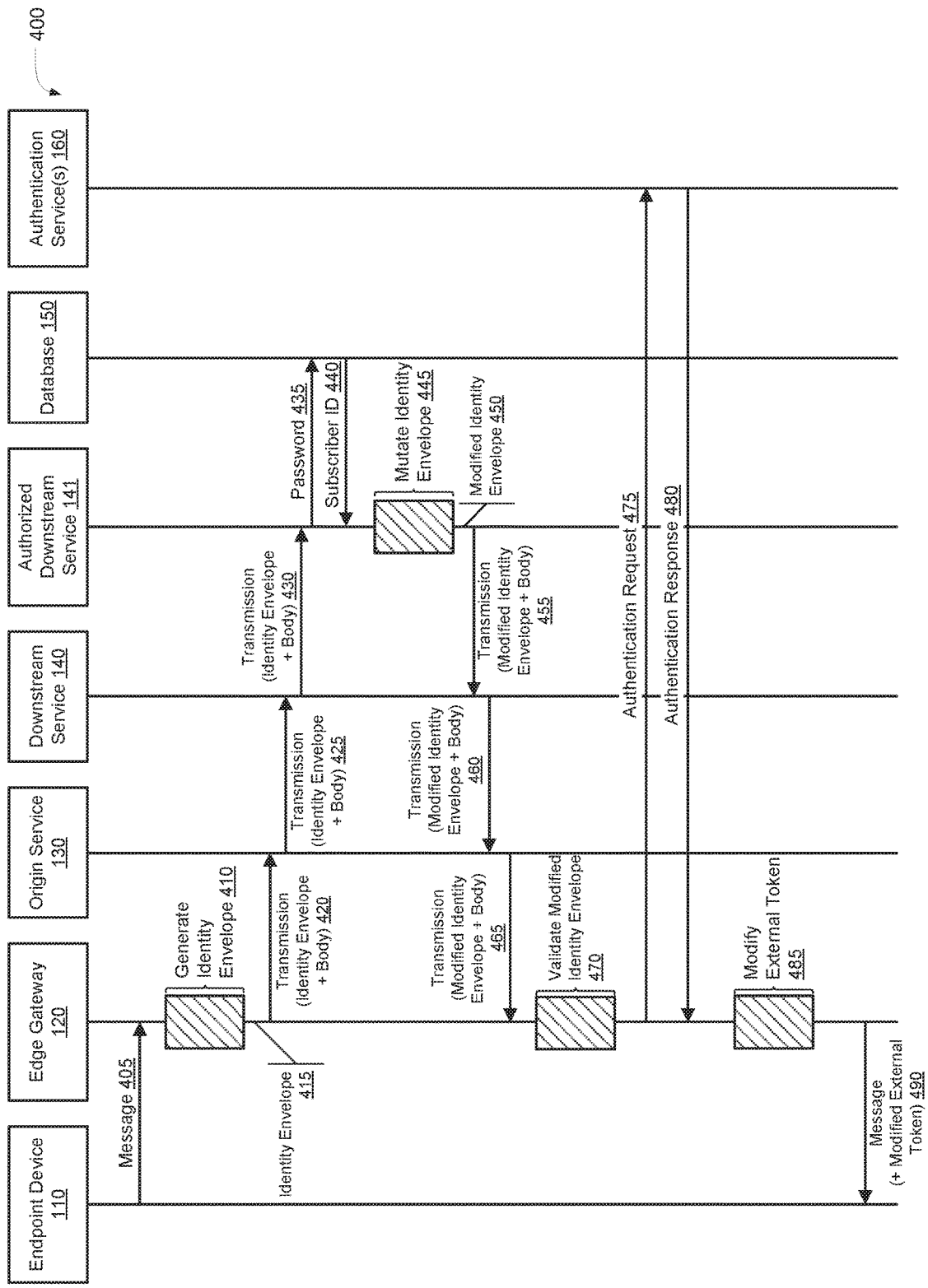
FIG. 4 illustrates a call flow diagram showing interactions between various components of the example edge network, according to various embodiments of the present invention.

FIG. 4 illustrates a call flow diagram 400 showing interactions between various components of the example edge network 100, according to various embodiments of the present invention. One or more components of edge network 100 may perform various operations to process, route, and/or modify identity envelope 125 and/or modified identity envelope 145 within edge network 100.

Each component within edge network 100 processes identity envelopes 125, 145 using at least one of four techniques: pass-through, read-only, mutation, and/or verification. In various embodiments, one or more components included in edge network 100 may route identity envelopes 125, 145 without reading or modifying the envelopes ("pass through"). The one or more components may alternatively read contents within identity envelopes 125, 145 without modifying the envelopes ("read only"). Further, the one or more components may take actions to add, delete, and/or modify one or more values included within identity envelopes 125, 145 in order to generate a modified identity envelope ("mutation"). Finally, the one or more components may review the actions taken by one or more other components that altered the contents of modified identity envelope 145 in order to confirm such actions were authorized ("verification"). In this manner, the one or more components included in edge network 100 orchestrate the use of identity envelopes 125, 145 as trusted data objects that attest the identity of the client and endpoint device 110 within edge network 100.

Endpoint device 110 sends message 405 to edge gateway 120 included in edge network 100. Message 405 includes information about the client and/or endpoint device 110. In various embodiments, message 405 can include one or more external tokens that specify authentication information associated with the user identity and/or device identity. In some embodiments, one or more authentication tokens may be included in message 405. In some embodiments, endpoint device 110 may send multiple messages 405 (e.g., 405(1), 405(2), etc.) to edge gateway 120. Additionally or alternatively, message 405 may include multiple authentication tokens and/or cookies. In various embodiments, the authorization tokens and/or cookies are included in the header of message 405. In some embodiments, endpoint device 110 transmits the authorization tokens and/or cookies out-of-band as metadata associated with message 405. For example, endpoint device 110 could send message 405 that includes a login request to access a service included in edge network 100. The body of message 405 could include the login request, while the header of message 405 could include an authentication token identifying the client. In other examples, endpoint device 110 could send a message 405 that includes a processing request via an in-band communication channel, and could send an authentication cookie via an out-of-band communication channel.

Edge gateway 120 performs actions 410 to generate identity envelope 415. Edge gateway 120 executes one or more edge service filters 121 to extract user information and/or device information from the authorization tokens and/or cookies. Edge gateway 120 generates identity envelope 415 based on the extracted information. In various embodiments, edge gateway 120 may retrieve one or more keys to include in identity envelope 415. For example, identity envelope application 123 could add public keys from one or more public/private key pairs (e.g., user information key 315 and/or device information key 325) in identity envelope 415.

In various embodiments, one or more components in edge network 100 may pass through messages that include identity envelope 415 (or have identity envelope 415 linked as metadata) to other devices without reading the contents of identity envelope 415. For example, edge gateway 120 could send to origin service 130 a transmission 420 that includes the body of message 405 received by edge gateway (e.g., the login request). Transmission 420 could also include identity envelope 415. Origin service 130 could, without reading the contents of identity envelope 415, send to downstream service 140 a separate transmission 425 that includes both the body of message 405 and identity envelope 415.

In various embodiments, one or more components in edge network 100 may read identity envelope 415 without modifying the contents of identity envelope 415. For example, downstream service 140 could read one or more identifier values included in identity envelope 415. Downstream service 140 could trust the contents of identity envelope 415 as authentic and could use the identification information (e.g., user information 310 and/or device information 320) in order to perform various services. For example, downstream service 140 could read the contents of identity envelope 415 in order to provide personalization services for the client. Upon reading identity envelope 415, downstream service 140 sends to authorized downstream service 141 a transmission 430 includes the body of message 405 and identity envelope 415.

Authorized downstream service 141 mutates identity envelope 415 by performing one or more actions to change the contents included in identity envelope 415, thereby generating modified identity envelope 450. In various embodiments, authorized downstream service 141 may perform one of a list of authorized actions, specified by edge gateway 120, in order to modify the contents of identity envelope 415. Such actions performed by one or more of origin service 130, downstream service 140, and/or authorized downstream service 141, include, for example, a user login, a profile change, and/or a data update.

For example, authorized downstream service 141 may be an authentication service that receives transmission 430, which includes a login request within the body of message 405, along with identity envelope 415. In response, authorized downstream service 141 could perform a login action by retrieving subscriber information that is stored in database 150 (e.g., a subscriber database). In such instances, authorized downstream service 141 could perform the login action by extracting login information from transmission 430. The login information could include the user's password and/or e-mail address as part of the login request, along with one or more identity values included in identity envelope 415. Authorized downstream service 141 then generates and sends transmission 435, which includes the login information extracted from message 405 (e.g., user password) and/or one or more identity values extracted from identity envelope 415 (e.g., user information 310) in order to identify subscriber information stored in database 150. Database 150 sends a transmission 440 that includes the stored subscriber information. The stored subscriber information could include a stored subscriber ID that is different than the one or more identifier values included in identity envelope 415.

Authorized downstream service 141 performs one or more actions 445 to mutate identity envelope 415 into modified identity envelope 450. In various embodiments, authorized downstream service 141 may use information, such as the stored subscriber ID received in transmission 440, to overwrite values included in identity envelope 415. For example, customer GUID and account owner ID values, which were included in identity envelope 415, can be overwritten with modified customer GUID and account owner ID values. In various embodiments, changing the user values may also cause hashes generated from the original values to be updated as well. In some embodiments, modified identity envelope 450 may store an entry that specifies the action taken by authorized downstream service 141 that caused the contents of identity envelope 415 to change, along with the associated information, such as the name of a key used to perform the action, as well as the updated value and associated hash. Modified identity envelope 450 may link the previous hash with the entry specifying the action taken to update the data value.

Upon generating modified identity envelope 450, authorized downstream service 141 sends to downstream service 140 a transmission 455 that includes both a body of a message, as well as modified identity envelope 450. For example, the message body could include a login response generated by authorized downstream service 141. In various embodiments, one or more downstream services 140 and/or origin services 130 may send transmissions to other devices, and may pass through and/or read modified identity envelope 450 without modifying the contents of identity envelope 450.

For example, transmissions 460, 465 may include modified identity envelope 450 without performing actions that apply further modifications. In other embodiments, multiple edge services 130, 140 may mutate modified identity envelope 450. In such instances, modified identity envelope 450 may be replaced by a supplemental identity envelope (not shown), where the supplemental identity envelope stores entries for both the change from identity envelope 415 to modified identity envelope 450, as well as the change from modified identity envelope 450 to the supplemental identity envelope. For example, the supplemental identity envelope may include an action log that includes multiple entries and previous hashes. The action log may link the multiple entries and/or previous hashes in a chain such that each modification made on a user data value, from the original data value to the current data value, is recorded in the action log.

Edge gateway 120 performs one or more actions 470 to validate modified identity envelope 450 by verifying each action performed by a component in edge network 100 that changed the contents of modified identity envelope 450. In various embodiments, identity envelope application 123 includes a list of defined actions that are authorized to be performed by components in edge network 100. In some embodiments, the list of defined actions specifies that authorized downstream service 141 that is permitted to perform a given defined action. For example, identity envelope application 123 may include a list of defined actions specifying that authorized downstream service 141 (i.e., the authentication service) is allowed to perform login actions. Identity envelope application 123 checks each entry included in modified identity envelope 450 to verify each action taken that mutated identity envelope 415 into modified identity envelope 450.

In various embodiments, identity envelope application 123 may confirm whether an approved key was used when performing the action. For example, identity envelope application 123 may check the entry included in modified identity envelope 450 to determine whether authorized downstream service 140 executed the login action with a key that is associated with user identity values. Additionally or alternatively, when modified identity envelope 450 stores a hash that was generated using a private key of a public/private key pair, identity envelope application 123 may check the entry with the corresponding public key in order to determine whether authorized downstream service 140 executed the login action.

When identity envelope application 123 confirms that the action specified in the entry is approved, identity envelope application 123 approves the updated identity value; otherwise, identity envelope application 123 reverts the identity value (e.g., reverting a modified Account Owner ID to the previous Account Owner ID).

In some embodiments, edge gateway 120 may, upon validating modified identity envelope 450, terminate modified identity envelope 450. In such instances, edge gateway 120 may wait to receive a subsequent message from endpoint device 110 in order to generate a different identity envelope based on the authentication identity object included in the subsequently-received message.

In various embodiments, upon validating each recorded change in modified identity envelope 450, edge gateway 120 may generate an external authentication token and/or cookie based on information included in modified identity envelope 450. For example, edge gateway 120 may use one or more edge service filters 121 send authentication request 475 to authentication services 160 in order to authenticate the contents of modified identity envelope 450. In some embodiments, authentication request 475 includes information extracted from modified identity envelope 450. In such instances, one or more authentication services 160 may send back to edge gateway 120 an authentication response 480 that confirms the information included in authentication request 475 is correct.

Upon receiving confirmation in the form of authentication response 480, edge gateway 120 performs one or more actions 485 to generate a modified external authentication tokens and/or cookies with the information included in modified identity envelope 145. For example, an authentication service 160 could generate a new external authentication token that includes modified user values included in modified identity envelope 450. Upon generating the modified external token, edge gateway 120 sends to endpoint device 110 a message 490 that includes the modified external token.

Figure 5:
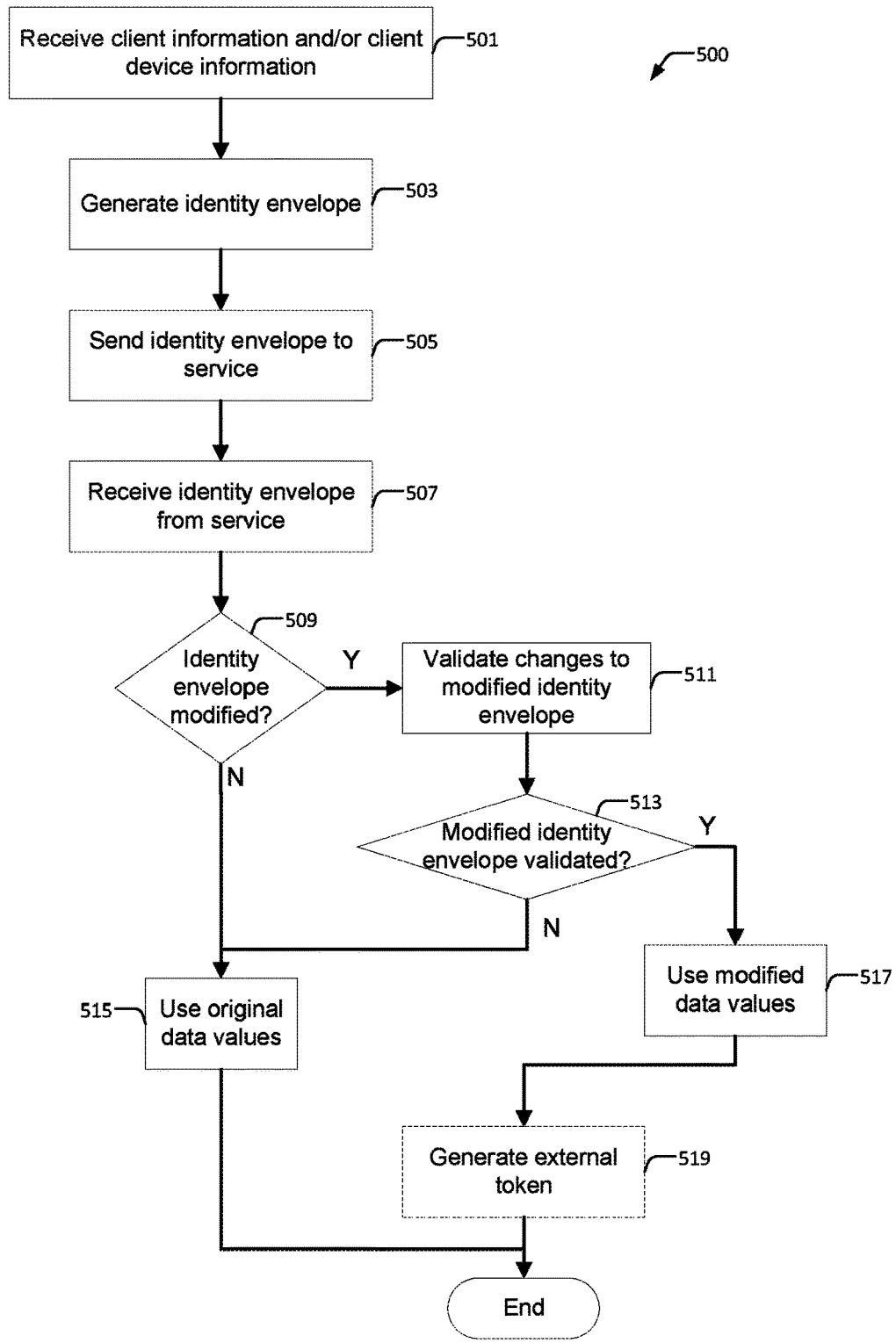
FIG. 5 sets forth a flow diagram of method steps for verifying an identity envelope after modification by a service in the edge network of FIG. 1, according to various embodiments of the present invention.

FIG. 5 sets forth a flow diagram of method 500 steps for verifying an identity envelope after modification by a service in the edge network of FIG. 1, according to various embodiments of the present invention. Although the method steps are described with reference to the systems and call flows of FIGS. 1-4, persons skilled in the art will understand that any system configured to implement the method steps, in any order, falls within the scope of the present invention.

Method 500 begins at step 501, edge gateway 120 receives client information and/or client device information. Edge gateway 120 receives a message 405 from endpoint device 110 with information that identifies the client and/or endpoint device 110. In various embodiments, message 405 can include one or more external tokens that specify authentication information associated with the user identity and/or device identity. In various embodiments, the authorization tokens and/or cookies are included in the header of message 405. In some embodiments, endpoint device 110 transmits the authorization tokens and/or cookies out-of-band as metadata associated with message 405.

At step 503, edge gateway 120 generates identity envelope 415. Edge gateway 120 executes one or more edge service filters 121 to extract user information and/or device information from the authorization tokens and/or cookies. Edge gateway 120 generates identity envelope 415 based on the extracted information. In various embodiments, edge gateway 120 may retrieve one or more keys to include in identity envelope 415. For example, identity envelope application 123 could add public keys from one or more public/private key pairs (e.g., user information key 315 and/or device information key 325) in identity envelope 415.

At step 505, edge gateway 120 sends a transmission 420 that includes identity envelope 415. Edge gateway 120 sends transmission 420 to origin service 130 in order for one or more services within edge network 100 to process a request that is included in transmission 420. In various embodiments, one or more components in edge network 100 may pass through messages that include identity envelope 415 (or have identity envelope 415 linked as metadata) to other devices without reading the contents of identity envelope 415. In various embodiments, one or more components in edge network 100 (e.g., origin service 130, downstream service 140) may process the body of message 405 and/or read identity envelope 415 without modifying the contents of identity envelope 415.

In various embodiments, authorized downstream service 141 performs one or more actions to mutate identity envelope 125 by performing one or more actions to change the contents included in identity envelope 125, thereby generating modified identity envelope 450. In various embodiments, authorized downstream service 141 may perform one of a list of authorized actions, specified by edge gateway 120, in order to modify the contents of identity envelope 125. For example, authorized downstream service 141 may be an authentication service that uses a password included in the body of message 405 and one or more identity values included in identity envelope 415 to retrieve a subscriber ID from database 150. Authorized downstream service 141 could then replace an identity value included in identity envelope 415 with the retrieved subscriber ID, thereby generating modified identity envelope 450.

At step 507, edge gateway 120 receives an identity envelope from a service within edge network 100. In some embodiments, no service modifies identity envelope 415 as identity envelope 415 is included in various transmissions within edge network 100. In such instances, edge gateway 120 receives identity envelope 415 from origin service 130. In alternate embodiments, upon generating modified identity envelope 450, authorized downstream service 141 sends to downstream service 140 a transmission 455 that includes both a body of a message, as well as modified identity envelope 450. In various embodiments, one or more downstream services 140 and/or origin services 130 may send transmissions to other devices, and may pass through and/or read identity envelopes 415, 450 without modifying the contents of identity envelopes 415, 450. Edge gateway 120 receives from origin service 130 a transmission 465 that includes one of identity envelope 415 or modified identity envelope 450.

At step 509, determines whether the identity envelope received from origin service 130 was modified. In various embodiments, edge gateway 120 may process the contents of the identity envelope to determine whether the identity envelope mutated from identity envelope 415 to modified identity envelope 450. For example, edge gateway 120 may read the contents of the identity envelope to determine whether there are any entries 351 that recorded actions taken by one or more services that modified the one or more identity values included in the identity envelope. If edge gateway 120 determines that no changes were made, edge gateway 120 determines that the received identity envelope is an un-modified identity envelope 415, edge gateway 120 proceeds to step 515. Otherwise, edge gateway 120 determines that changes were made, determines that the received identity envelope is modified identity envelope 450, and proceeds to step 511.

At step 511, edge gateway 120 attempts to validate modified identity envelope 450 by verifying each action performed by a component in edge network 100 that changed the contents of modified identity envelope 450. At step 513, edge gateway determines whether modified identity envelope 450 was validated. In various embodiments, edge gateway 120 may include a list of defined actions that are authorized to be performed by components in edge network 100.

In some embodiments, the list of defined actions may specify that authorized downstream service 141 that is permitted to perform a given defined action. For example, edge gateway 120 may include a list of defined actions specifying that authorized downstream service 141 is allowed to perform login actions. Edge gateway 120 could, at step 511 check each entry and/or hash included in modified identity envelope 450 to verify each action taken that mutated identity envelope 125 into modified identity envelope 145. In some embodiments, edge gateway 120 may confirm whether an approved key was used when performing the action that changed the identity value. For example, edge gateway 120 may, at step 511, check the key name listed in an entry 351 that is included in modified identity envelope 450 in order to determine whether authorized downstream service 141 executed a login action with a key that is associated with user identity values. Additionally or alternatively, edge gateway 120 may check each entry 351 to check the accuracy of the change made. For example, edge gateway 120 could check an entry logging a change to the ESN associated with a client device in order to ensure that one or more data values associated with the user were also not changed in the same action.

When edge gateway 120 confirms at step 513 that the action specified in the entry is approved, edge gateway 120 validates the updated identity value and proceeds to step 517; otherwise, edge gateway 120 does not validate the updated identity value and proceeds to step 515.

At step 515, edge gateway 120 uses the original data value included in modified identity envelope 145. In various embodiments, edge gateway at step 513 does not validate the modified identity value, and reverts to using the original identity value included in modified identity envelope 145 (e.g., using the series of entries in action log 350 to revert a modified Account Owner ID to the previous Account Owner ID). In such instances, edge gateway 120 uses the original data value instead of the modified data value in subsequent actions.

Alternatively, at step 517, edge gateway 120 validates the modified identity value. In such instances, edge gateway 120 uses the modified data value in subsequent actions. In some embodiments, edge gateway 120 may, upon validating modified identity envelope 450, terminate modified identity envelope 450. In such instances, edge gateway 120 may wait to receive a subsequent message from endpoint device 110 in order to generate a different identity envelope based on the authentication identity object included in the subsequently-received message.

At step 519, edge gateway 120 may optionally generate an external token. In various embodiments, upon validating each recorded change in modified identity envelope 450, edge gateway 120 may generate an external authentication token and/or cookie based on information included in modified identity envelope 450. For example, edge gateway 120 may use one or more edge service filters 121 send authentication request 475 to authentication services 160 to authenticate the contents of modified identity envelope 450. In some embodiments, authentication request 475 includes information extracted from modified identity envelope 450. In such instances, one or more authentication services 160 may send back to edge gateway 120 an authentication response 480 that confirms the information included in authentication request 475 is correct. Upon receiving confirmation in the form of authentication response 480, edge gateway 120 at 485 generates a modified external authentication tokens and/or cookies with the information included in modified identity envelope 145. For example, an authentication service 160 could generate a new external authentication token that includes modified user values included in modified identity envelope 450. Upon generating the modified external token, edge gateway 120 sends to endpoint device 110 a message 490 that includes the modified external token.

Network Infrastructure

Figure 6:
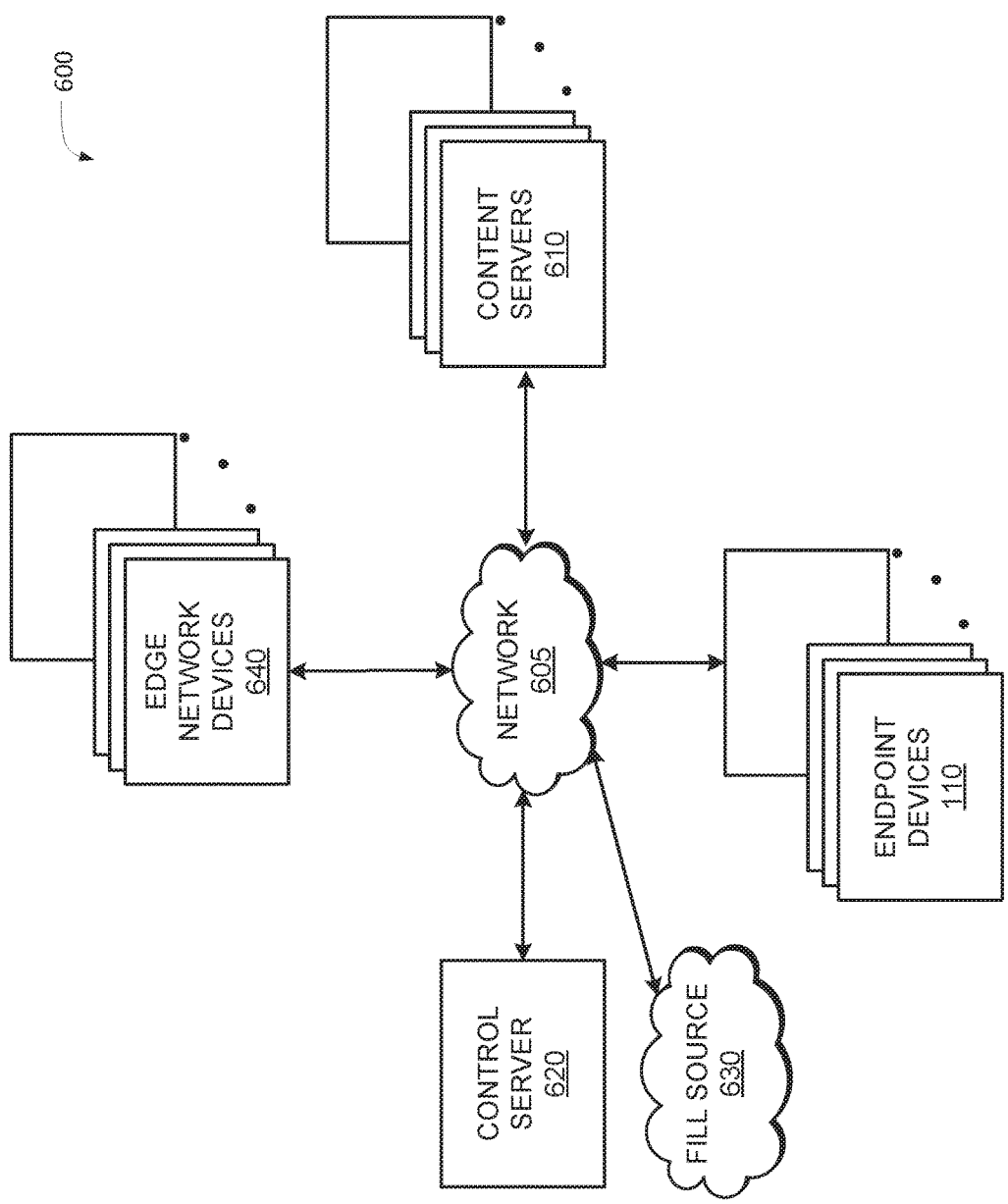
FIG. 6 illustrates a network infrastructure that includes the edge network of FIG. 1, according to various embodiments of the present invention.

FIG. 6 illustrates network infrastructure 600 that includes the edge network 100 of FIG. 1, according to various embodiments of the present invention. As shown, network infrastructure 600 includes endpoint devices 110, content servers 610, control server 620, and edge network devices 640, each of which are connected via communications network 605. Network infrastructure 600 is configured to distribute content to content servers 610, and such content is then distributed on demand to endpoint devices 110.

Each endpoint device 110 communicates with one or more content servers 610 (also referred to as "caches" or "nodes") via edge network devices 640 in order to download content, such as textual data, graphical data, audio data, video data, and other types of data. The downloadable content, also referred to herein as a "file," is then presented to a user of one or more endpoint devices 110. In various embodiments, endpoint devices 110 may include computer systems, set-top boxes (STBs), mobile computers, smartphones, tablets, console and handheld video game systems, digital video recorders (DVRs), DVD players, connected digital TVs, dedicated media streaming devices (e.g., the Roku® set-top box), and/or any other technically-feasible computing platform that has network connectivity and is capable of presenting content, such as text, images, audio, and/or video content, to a user.

Each content server 610 includes, without limitation, a storage device that may be a standalone networked attached storage (NAS) system, a storage area-network (SAN), a cluster or "farm" of storage devices, a distributed storage architecture, or any other device suitable for implementing one or more aspects of the present disclosure. Additionally or alternatively, each content server 610 may include, without limitation, a computing device with a storage subsystem that may be a standalone server, a cluster or "farm" of servers, one or more network appliances, or any other device suitable for implementing one or more aspects of the present disclosure. Each content server 610 may include, without limitation, a web server and a database, and may be configured to communicate with the control server 620 to determine the location and availability of various files that are monitored and managed by the control server 620. Each content server 610 may further communicate with a fill source 630 and one or more other content servers 610 in order "fill" each content server 610 with copies of various files. In addition, the content servers 610 may respond to requests for files received from the endpoint devices 110. The files may then be distributed from the content server 610 or via a broader content distribution network. In some embodiments, the content servers 610 enable users to authenticate (e.g., using a username and password) in order to access files stored on the content servers 610.

In operation, the edge services devices 640 (e.g., edge gateway 120, origin service 130, downstream service 140, authorized downstream service 141, etc.) act as a gateway to the control server 620 that implements the service. Among other things, the edge network devices 640 receives requests from the endpoint devices 110 and routes the requests to the control server 620 that executes software that implements the service.

Control server 620 may include, without limitation, a computing device that may be a standalone server, a cluster or "farm" of servers, one or more network appliances, or any other device suitable for implementing one or more aspects of the present disclosure. Although only a single control server 620 is shown in FIG. 6, in various embodiments multiple control servers 620 (e.g., control server 620(1), 620(2), etc.) may be implemented to monitor and manage files.

In various embodiments, cloud services 630 may include an online storage service (OSS) (e.g., Amazon® Simple Storage Service, Google® Cloud Storage, etc.) in which a catalog of thousands or millions of files is stored and/or accessed in order to fill content servers 610. Cloud services 630 also may provide computing and/or other processing services. Although only one cloud service 630 is shown in FIG. 6, in various embodiments, multiple cloud services 630 (e.g., cloud service 630(1), 630(2), etc.) may be implemented.

Figure 7:
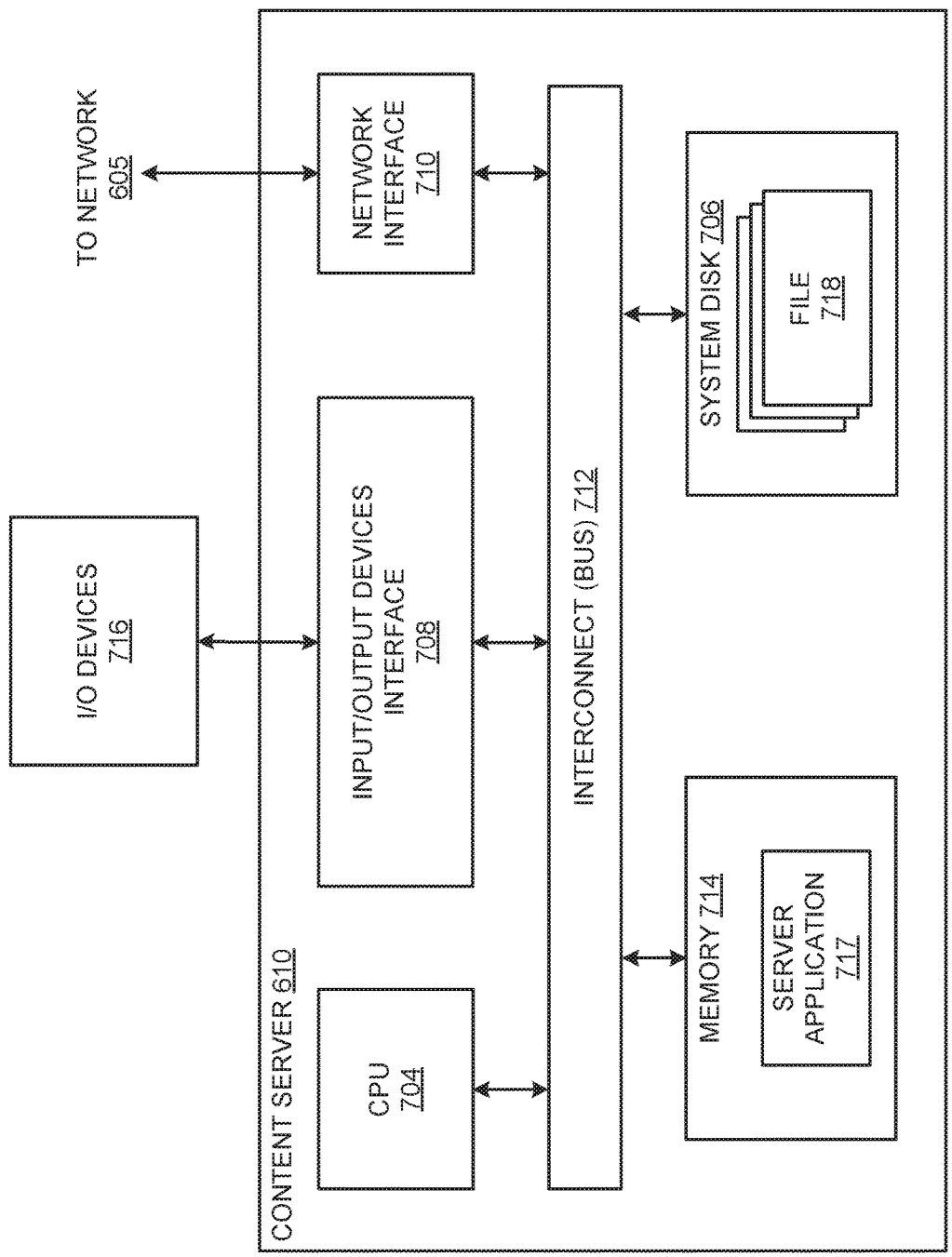
FIG. 7 is a more-detailed illustration of the content server of FIG. 5, according to various embodiments of the present invention.

FIG. 7 is a more-detailed illustration of the content server 610 of FIG. 6, according to various embodiments of the present invention. As shown, content server 610 includes, without limitation, central processing unit (CPU) 704, system disk 706, input/output (I/O) devices interface 708, network interface 710, interconnect (bus) 712, and system memory 714.

CPU 704 is configured to retrieve and execute programming instructions, such as server application 717, stored in system memory 714. Similarly, CPU 704 is configured to store application data (e.g., software libraries) and retrieve application data from system memory 714. Interconnect 712 is configured to facilitate transmission of data, such as programming instructions and application data, between CPU 704, system disk 706, I/O device interface 708, network interface 710, and system memory 714. I/O device interface 708 is configured to receive input data from one or more I/O devices 716 and transmit the input data to CPU 704 via interconnect 712. For example, the one or more I/O devices 716 may include one or more buttons, a keyboard, a mouse, and/or other input devices. I/O device interface 708 is further configured to receive output data from CPU 704 via interconnect 712 and transmit the output data to the one or more I/O devices 716.

System disk 706 may include one or more hard disk drives (HDDs), solid-state storage devices (SSDs), and/or similar storage devices. System disk 706 is configured to store nonvolatile data, such as one or more files 718 (e.g., audio files, video files, subtitles, application files, software libraries, etc.). Files 718 can then be retrieved by one or more endpoint devices 110 via network 605. In some embodiments, network interface 710 is configured to operate in compliance with one or more communications standards, such as the Ethernet standard, the Bluetooth standard, and/or one or more wireless communication standards.

System memory 714 includes server application 717, which configures content server 610, to service requests received from endpoint device 110, edge network devices 640, and other content servers 610. For example, the service request could be for one or more files 718. When server application 717 receives a service request for a specific file, server application 717 retrieves the corresponding file 718 from system disk 706 and transmits file 718 to endpoint device 110 and/or content server 610 via network 605.

File 718 could, for example, be one of a plurality of digital items, such visual content items like videos and/or still images. Similarly, file 718 could be one of a plurality of textual content items associated with one or more visual content items, such as movie metadata. In various embodiments, file 718 may be a one of a plurality of secure application data items associated with one or more content items and/or applications being executed by content server 610, control server 620, and/or endpoint device 110.

Figure 8:
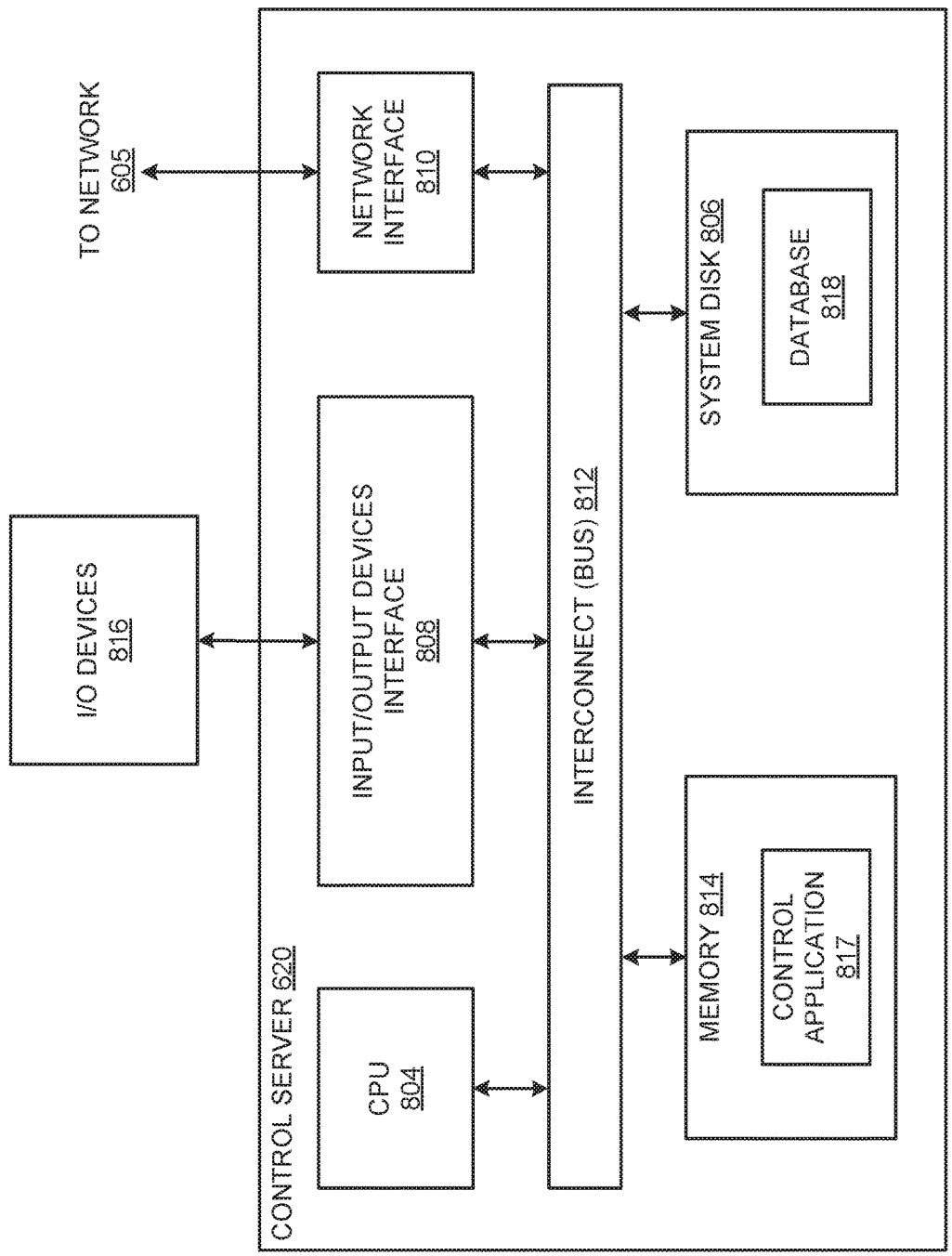
FIG. 8 is a more-detailed illustration of the control server of FIG. 5, according to various embodiments of the present invention.

FIG. 8 is a more-detailed illustration of the control server 620 of FIG. 6, according to various embodiments of the present invention. As shown, control server 620 includes, without limitation, CPU 804, system disk 806, I/O devices interface 808, network interface 810, interconnect 812, and system memory 814.

CPU 804 is configured to retrieve and execute programming instructions, such as control application 817, stored in system memory 814. Similarly, CPU 804 is configured to store application data (e.g., software libraries) and retrieve application data from system memory 814 and/or database 818 that is stored in system disk 806. Interconnect 812 is configured to facilitate transmission of data between CPU 804, system disk 806, I/O devices interface 808, network interface 810, and system memory 814. I/O devices interface 808 is configured to transmit input data and output data between the one or more I/O devices 816 and CPU 804 via interconnect 812. In various embodiments, system disk 806 may include one or more hard disk drives, solid state storage devices, etc. In various embodiments, system disk 806 is configured to store database 818 that stores information associated with one or more content servers 610, cloud services 630, edge network devices 640, and/or files 718.

System memory 814 includes control application 817 configured to access information stored in database 818 and process the information to determine the manner in which specific files 718 will be replicated across content servers 610 included in network infrastructure 600. Control application 817 may further be configured to receive and analyze performance characteristics associated with one or more content servers 610 and/or endpoint devices 110.

In various embodiments, control application 817 may further be configured to transmit one or more font patch files stored in database 818 to endpoint devices 110. For example, endpoint device 110 could send one or more update requests to control server 620 for each font patch file stored in database 818. Control application 817 could be configured to respond to the one or more update requests by identifying one or more font patch files stored in database 818 and sending the one or more font patch files to endpoint device 110. Additionally or alternatively, control application 817 may be configured to transmit one or more font patch files without receiving a request from endpoint device 110. For example control application 817 could be configured to periodically send one or more font patch files to each endpoint device 110 included in network infrastructure 600.

Figure 9:
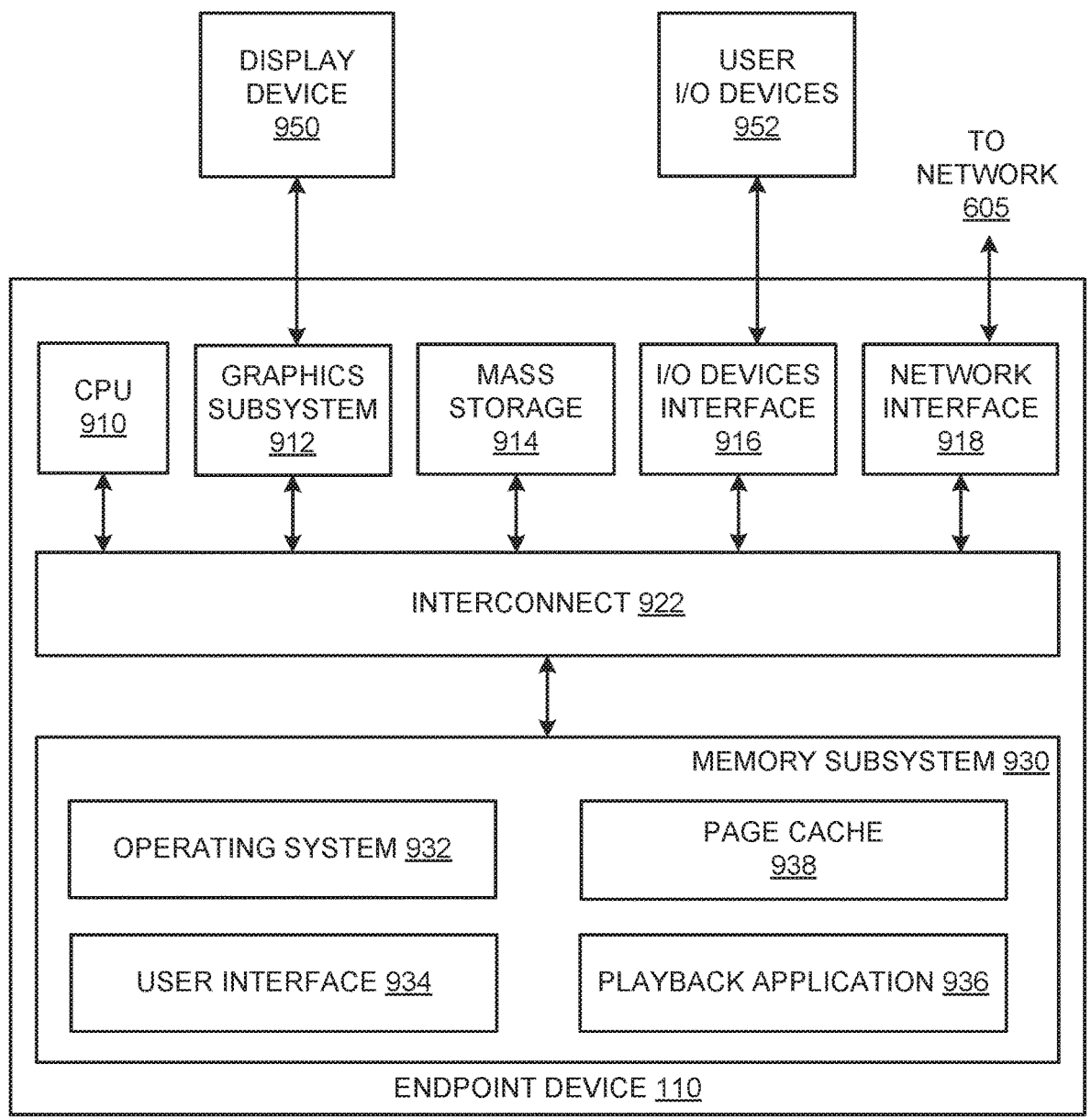
FIG. 9 is a more-detailed illustration of the endpoint device of FIG. 5, according to various embodiments of the present invention.

FIG. 9 is a more-detailed illustration of the endpoint device 110 of FIG. 6, according to various embodiments of the present invention. As shown, endpoint device 110 may include, without limitation, CPU 910, graphics subsystem 912, mass storage unit 914, I/O devices interface 916, network interface 918, interconnect 922, and memory subsystem 930.

In some embodiments, CPU 910 is configured to retrieve and execute programming instructions stored in memory subsystem 930. Similarly, CPU 910 is configured to store and retrieve application data (e.g., software libraries) residing in the memory subsystem 930. Additionally or alternatively, CPU 910 is configured to store and retrieve data, including content items and/or application data, from mass storage unit 914. Interconnect 922 is configured to facilitate transmission of data, such as programming instructions and application data, between the CPU 910, graphics subsystem 912, mass storage unit 914, I/O devices interface 916, network interface 918, and memory subsystem 930.

Graphics subsystem 912 is configured to generate frames of video data and transmit the frames of video data to display device 950. In various embodiments, graphics subsystem 912 may be integrated, along with CPU 910, into an integrated circuit (IC). Display device 950 may comprise any technically-feasible means for generating an image for display. For example, display device 950 could be fabricated using liquid crystal display (LCD) technology, cathode-ray tube technology, and/or light-emitting diode (LED) display technology.

Mass storage unit 914 can include, for example, a hard disk drive and/or flash-memory storage drive, and is configured to store nonvolatile data. For example, mass storage unit 914 could store one or more files 718, such as content items and/or application data. In various embodiments, endpoint device 110 may copy one or more files 718 stored in memory subsystem 930 (e.g., secure application data) to mass storage unit 914.

Input/output (I/O) device interface 916 is configured to receive input data from user one or more I/O devices 952 and transmit the input data to CPU 910 via interconnect 922. For example, user I/O device 952 may comprise one of more buttons, a keyboard, and a mouse or other pointing device. In various embodiments, I/O device interface 916 also includes an audio output unit configured to generate an electrical audio output signal. In such instances, user I/O device 952 may include an audio output device, such as headphones and/or a loudspeaker, configured to generate an acoustic output in response to the electrical audio input signal. Additionally or alternatively, display device 950 may include the loudspeaker. Examples of suitable devices known in the art that can display video frames and generate an acoustic output include televisions, smartphones, smartwatches, electronic tablets, etc.

Network interface 918 is configured to transmit and receive packets of data via network 605. In some embodiments, network interface 918 is configured to communicate using at least one of the Ethernet standard, the Bluetooth standard, and/or one or more wireless communication standards. Network interface 918 is coupled to CPU 910 via interconnect 922.

Memory subsystem 930 includes programming instructions and application data. In various embodiments, memory subsystem may include operating system 932, user interface 934, playback application 936, and/or page cache 938. Operating system 932 performs system management functions, such as managing hardware devices including graphics subsystem 912, mass storage unit 914, I/O device interface 916, and network interface 918. Operating system 932 also provides process and memory management models for user interface 934, playback application 936, and page cache 938. For example, endpoint device 110 may execute operating system 932 to write data to page cache 938 and/or sync data included in page cache 938 to mass storage unit 914.

User interface (UI) 934, for example, a graphical user interface (GUI) employing a window-and-object metaphor, provides a mechanism for user interaction with endpoint device 110. Persons skilled in the art will recognize the various operating systems 932 and/or user interfaces 934 that are suitable for incorporation into endpoint device 110. Playback application 936 is configured to request and/or receive content (e.g., one or more files 718) from content server 610 via network interface 918. Further, playback application 936 is configured to interpret the content and present the content via display device 950 and/or user I/O devices 952.

Page cache 938 is a portion of volatile memory that stores files 718, such as content items and/or application data (e.g., secure application data, metadata, etc.). In various embodiments, page cache 938 may correspond to a section of nonvolatile memory. In such instances, endpoint device 110 may sync data initially written volatile memory by writing the data to the corresponding section of nonvolatile memory. For example, page cache 938 may correspond to a section of mass storage unit 914. In such instances, endpoint device 110 then reads and/or writes files 718 to page cache 938 in lieu of accessing and/or files 718 directly in mass storage unit 914. Endpoint device 110 could then sync data between page cache 938 and mass storage unit 914 so that copies of data are stored in both page cache 938 and mass storage unit 914.

In sum, an edge gateway receives various authentication data structures, such as authentication tokens or cookies, associated with a client (user) and a client device. The edge gateway processes the authentication data structures and generates an identity envelope that includes both information that identifies the client, and information that identifies the client device. Upon generating the identity envelope, the edge gateway sends the identity envelope to other services within the edge network. In various embodiments, the identity envelope is sent out-of-band as metadata associated with an in-band message. Each service within the edge network passes the identity envelope, reads the contents of the identity envelope, or mutates the identity envelope by changing the values stored in the identity envelope.

In various embodiments, the identity envelope mutates one or more times by services within the edge network. Once the edge gateway receives the modified identity envelope, the edge gateway validates that the mutations were made by authorized services performing approved actions. In some embodiments, the edge gateway verifies the actions by comparing the recorded actions, which were performed on the identity envelope, to a list of approved actions and/or services. In some embodiments, the edge gateway verifies that a specified key was used by a service to perform the recorded action. Upon verifying that the recorded actions were approved, the edge gateway confirms the changes to the information included in the identity envelope and may use the information included in the identity envelope to update one or more authentication tokens and/or cookies.

At least one technological advantage of the disclosed techniques relative to the prior art is that a trusted device can orchestrate the use and modification of a single identity data object within a distributed computing system. Using a single identity data object enables services to trust the authenticity of both the user and associated device when attempting access to the distributed computing system. Further, restricting the devices within the distributed computing system that can modify the identity data object provides greater control on the information that is routed through the network through the identity data object.

1. In various embodiments, a computer-implemented method comprising receiving, by a first service operating within a computing system, a modified identity data object from a second service operating within the computing system, where the modified identity data object includes at least one identifier associated with a client of the computing system, determining, by the first service, that the second service performed a first action on an identity data object to generate the modified identity data object, and validating the modified identity data object based on whether the second service is authorized to perform the first action.

2. The computer-implemented method of clause 1, further comprising generating, by the first service, the identity data object that includes the at least one identifier, where the second service performs the first action to modify the at least one identifier in order to generate the modified identity data object.

3. The computer-implemented method of clause 1 or 2, further comprising receiving, by the first service from a client device associated with the client, a first authentication token, and extracting, by the first service, a first identifier from the first authentication token, where the at least one identifier includes the first identifier.

4. The computer-implemented method of any of clauses 1-3, further comprising modifying, based on the modified identity data object, the first authentication token to generate a second authentication token.

5. The computer-implemented method of any of clauses 1-4, where the modified identity data object includes a first set of identifiers associated with the client, and a second set of identifiers associated with a client device, where the at least one identifier is included in the first set of identifiers, or the second set of identifiers.

6. The computer-implemented method of any of clauses 1-5, further comprising comparing, by the first service, the first action to a first list of authorized actions, where the first action is valid only when the first action matches at least one action included in the first list of authorized actions.

7. The computer-implemented method of any of clauses 1-6, further comprising determining, by the first service, that the second service is included in a first list of authorized services, where the first action is valid only when the second service is included in the first list of authorized services.

8. The computer-implemented method of any of clauses 1-7, where the second service performs the first action on the identity data object by receiving the identity data object, receiving a first message that includes information not included in the identity data object, generating a first request that includes a first portion based on data extracted from the identity data object, and a second portion based on data extracted from the information included in the first message, receiving a first response to the first request, and modifying the at least one identifier based on data included in the first response.

9. The computer-implemented method of any of clauses 1-8, further comprising identifying a first key used by the second service to perform the first action, and determining that the second service is authorized to use the first key to perform the first action.

10. Various embodiments include a computing system comprising a memory storing instructions, and a processor coupled to the memory that executes the instructions to perform the steps of receiving, by a first service operating within the computing system, a modified identity data object, from, where the modified identity data object includes at least one identifier associated with a client device of the computing system, determining that a second service operating within the computing system performed a first action on an identity data object to generate the modified identity data object, and validating the modified identity data object based on whether the second service is authorized to perform the first action.

11. The computing system of clause 10, where the processor further executes the instructions to perform the steps of receiving, by the first service, a first message via an in-band communication channel, where the modified identity data object is received by the first service via an out-of-band communication channel.

12. The computing system of clause 10 or 11, where the processor further executes the instructions to perform the steps of receiving, by the first service, a first message comprising a header and a body, where the header includes the modified identity data object.

13. The computing system of any of clauses 10-12, where a first device within a computing network executes the first service, and a second device within the computing system executes the second service.

14. The computing system of any of clauses 10-13, where the processor further executes the instructions to perform the steps of receiving, by the first service from a client device associated with the client, a first authentication token extracting a first identifier from the first authentication token, and generating, by the first service, the identity data object that includes the at least one identifier, where the at least one identifier includes the first identifier, and further where the second service performs the first action to modify the at least one identifier in order to generate the modified identity data object.

15. The computing system of any of clauses 10-14, where the modified identity data object includes a first set of identifiers associated with the client, and a second set of identifiers associated with a client device that is associated with the client.

16. The computing system of any of clauses 10-15, where the processor further executes the instructions to perform the steps of comparing, by the first service, the first action to a first list of authorized actions, where the first action is valid only when the first action matches at least one action included in the first list of authorized actions.

17. The computing system of any of clauses 10-16, where the processor further executes the instructions to perform the steps of determining, by the first service, that the second service is included in a first list of authorized services, where the first action is valid only when the second service is included in the first list of authorized services.

18. Various embodiments include one or more non-transitory computer-readable media storing instructions that, when executed by one or more processors, cause the one or more processors to perform the steps of receiving, by a first service operating within a computing system, a modified identity data object originating at a second service operating within the computing system, where the modified identity data object includes at least one identifier associated with a client of the computing system, determining, by the first service, that the second service performed a first action on an identity data object to generate the modified identity data object by adding the at least one identifier to the identity data object, and validating the modified identity data object based on whether the second service is authorized to perform the first action.

19. The one or more non-transitory computer-readable media of clause 18, further storing instructions that, when executed by the one or more processors, cause the one or more to perform the step of comparing, by the first service, the first action to a first list of authorized actions, where the first action is valid only when the first action matches at least one action included in the first list of authorized actions.

20. The one or more non-transitory computer-readable media of clause 18 or 19, further storing instructions that, when executed by the one or more processors, cause the one or more to perform the step of determining, by the first service, that the second service is included in a first list of authorized services, where the first action is valid only when the second service is included in the first list of authorized services.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   transmitting, by a first service operating within a computing system, a first identity data object to a second service operating within the computing system, wherein the first identity data object includes at least one identifier associated with a client of the computing system;
   receiving, by the first service, a second identity data object from the second service;
   comparing the second identity data object to the first identity data object;
   upon determining that the second identity data object is a modified version of the first identity data object, identifying, by the first service, a first action that the second service performed on the first identity data object to generate the second identity data object;
   determining whether the second service is authorized to perform the first action; and
   validating the second identity data object when the second service is authorized to perform the first action; or
   invalidating the second identity data object when the second service is not authorized to perform the first action.

2. The computer-implemented method of claim 1, further comprising:
   generating, by the first service, the first identity data object that includes the at least one identifier,
   wherein the second service performs the first action to modify the at least one identifier in order to generate the second identity data object.

3. The computer-implemented method of claim 2, further comprising:
   receiving, by the first service from a client device associated with the client, a first authentication token; and
   extracting, by the first service, a first identifier from the first authentication token, wherein the at least one identifier includes the first identifier.

4. The computer-implemented method of claim 3, further comprising modifying, based on the second identity data object, the first authentication token to generate a second authentication token.

5. The computer-implemented method of claim 1, wherein the second identity data object includes:
   a first set of identifiers associated with the client; and
   a second set of identifiers associated with a client device, wherein the at least one identifier is included in the first set of identifiers, or the second set of identifiers.

6. The computer-implemented method of claim 1, wherein:
   determining whether the second service is authorized to perform the first action comprises at least one of comparing the first action to a first list of authorized actions or determining whether a key used by the second service to when performing the first action is an authorized key, and
   the second service is authorized to perform the first action when the first action matches at least one action included in the first list of authorized actions or when the key matches the authorized key.

7. The computer-implemented method of claim 1, further comprising determining, by the first service, that the second service is included in a first list of authorized services, wherein the second service is authorized to perform the first action only when the second service is included in the first list of authorized services.

8. The computer-implemented method of claim 1, wherein the second service performs the first action on the first identity data object by:
   receiving the first identity data object;
   receiving a first message that includes information not included in the first identity data object;
   generating a first request that includes:
      a first portion based on data extracted from the first identity data object, and
      a second portion based on data extracted from the information included in the first message;
   receiving a first response to the first request; and
   modifying the at least one identifier based on data included in the first response.

9. The computer-implemented method of claim 1, further comprising:
   identifying a first key used by the second service to perform the first action; and
   determining that the second service is authorized to use the first key to perform the first action.

10. A computing system, comprising:
    a memory storing instructions; and
    a processor coupled to the memory that executes the instructions to perform the steps of:
       transmitting, by a first service operating within a computing system, a first identity data object to a second service operating within the computing system, wherein the first identity data object includes at least one identifier associated with a client of the computing system;
       receiving, by the first service, a second identity data object from the second service;
       comparing the second identity data object to the first identity data object;
       upon determining that the second identity data object is a modified version of the first identity data object, identifying, by the first service, a first action that the second service performed on the first identity data object to generate the second identity data object;
       determining whether the second service is authorized to perform the first action; and
       validating the second identity data object when the second service is authorized to perform the first action; or
       invalidating the second identity data object when the second service is not authorized to perform the first action.

11. The computing system of claim 10, wherein the processor further executes the instructions to perform the steps of:
receiving, by the first service, a first message via an in-band communication channel,
wherein the second identity data object is received by the first service via an out-of-band communication channel.

12. The computing system of claim 10, wherein the processor further executes the instructions to perform the steps of receiving, by the first service, a first message comprising a header and a body, wherein the header includes the second identity data object.

13. The computing system of claim 10, wherein a first device within a computing network executes the first service, and a second device within the computing system executes the second service.

14. The computing system of claim 10, wherein the processor further executes the instructions to perform the steps of:
receiving, by the first service from a client device associated with the client, a first authentication token;
extracting a first identifier from the first authentication token; and
generating, by the first service, the first identity data object that includes the at least one identifier, wherein:
the at least one identifier includes the first identifier, and
the second service performs the first action to modify the at least one identifier in order to generate the second identity data object.

15. The computing system of claim 10, wherein the second identity data object includes:
a first set of identifiers associated with the client; and
a second set of identifiers associated with a client device that is associated with the client.

16. The computing system of claim 10, wherein
determining whether the second service is authorized to perform the first action comprises at least one of comparing the first action to a first list of authorized actions or determining whether a key used by the second service to when performing the first action is an authorized key, and
the second service is authorized to perform the first action when the first action matches at least one action included in the first list of authorized actions or when the key matches the authorized key.

17. The computing system of claim 10, wherein the processor further executes the instructions to perform the steps of determining, by the first service, that the second service is included in a first list of authorized services, wherein the second service is authorized to perform the first action only when the second service is included in the first list of authorized services.

18. One or more non-transitory computer-readable media storing instructions that, when executed by one or more processors, cause the one or more processors to perform the steps of:
transmitting, by a first service operating within a computing system, a first identity data object to a second service operating within the computing system, wherein the first identity data object includes at least one identifier associated with a client of the computing system;
receiving, by the first service, a second identity data object from the second service;
comparing the second identity data object to the first identity data object;
upon determining that the second identity data object is a modified version of the first identity data object, identifying, by the first service, a first action that the second service performed on the first identity data object to generate the second identity data object;
determining whether the second service is authorized to perform the first action; and
validating the second identity data object when the second service is authorized to perform the first action; or
invalidating the second identity data object when the second service is not authorized to perform the first action.

19. The one or more non-transitory computer-readable media of claim 18, wherein:
determining whether the second service is authorized to perform the first action comprises at least one of comparing the first action to a first list of authorized actions or determining whether a key used by the second service to when performing the first action is an authorized key, and
the second service is authorized to perform the first action when the first action matches at least one action included in the first list of authorized actions or when the key matches the authorized key.

20. The one or more non-transitory computer-readable media of claim 18, further storing instructions that, when executed by the one or more processors, cause the one or more to perform the step of determining, by the first service, that the second service is included in a first list of authorized services, wherein the second service is authorized to perform the first action only when the second service is included in the first list of authorized services.

* * * * *